(12) United States Patent
Moonen

(10) Patent No.: US 9,080,706 B2
(45) Date of Patent: Jul. 14, 2015

(54) SYSTEM AND METHOD FOR MEASURING FLOW RATES OF FLUID FLOWS TO PARALLEL REACTORS

(75) Inventor: Roelandus Hendrikus Wilhelmus Moonen, Amsterdam (NL)

(73) Assignee: AVANTIUM HOLDING B.V., Amsterdam (NL)

( * ) Notice: Subject to any disclaimer, the term of this patent is extended or adjusted under 35 U.S.C. 154(b) by 313 days.

(21) Appl. No.: 13/823,133

(22) PCT Filed: Oct. 3, 2011

(86) PCT No.: PCT/NL2011/050665
§ 371 (c)(1),
(2), (4) Date: May 30, 2013

(87) PCT Pub. No.: WO2012/047095
PCT Pub. Date: Apr. 12, 2012

(65) Prior Publication Data
US 2013/0319554 A1 Dec. 5, 2013

Related U.S. Application Data

(60) Provisional application No. 61/390,755, filed on Oct. 7, 2010.

(30) Foreign Application Priority Data

Oct. 7, 2010 (NL) ..................................... 2005476

(51) Int. Cl.
*F16K 11/22* (2006.01)
*F16L 41/02* (2006.01)
*B01J 19/00* (2006.01)
*C40B 60/12* (2006.01)

(52) U.S. Cl.
CPC ............. *F16L 41/02* (2013.01); *B01J 19/0046* (2013.01); *C40B 60/12* (2013.01); *B01J 2219/00286* (2013.01); *B01J 2219/00389* (2013.01); *B01J 2219/00585* (2013.01); *B01J 2219/00594* (2013.01); *B01J 2219/00698* (2013.01); *B01J 2219/00747* (2013.01); *Y10T 137/87265* (2015.04)

(58) Field of Classification Search
CPC .................. B01J 19/0046; B01J 2219/00389; F16L 41/02
USPC ......... 137/597, 599.01, 599.13, 883; 422/129
See application file for complete search history.

(56) References Cited

U.S. PATENT DOCUMENTS

| | | | |
|---|---|---|---|
| 5,266,270 A | 11/1993 | Ajot et al. | |
| 7,537,739 B2 * | 5/2009 | Haas et al. | 422/603 |
| 8,383,050 B2 * | 2/2013 | Haas et al. | 422/129 |

(Continued)

FOREIGN PATENT DOCUMENTS

| | | |
|---|---|---|
| WO | WO 99/64160 A1 | 12/1999 |
| WO | WO 2005/063372 A2 | 7/2005 |

*Primary Examiner* — Craig Schneider
*Assistant Examiner* — Reinaldo Sanchez-Medina
(74) *Attorney, Agent, or Firm* — Hoffmann & Baron, LLP

(57) ABSTRACT

A system for measuring flow rates of fluid flows to parallel reactors includes a common feed line, a plurality of reactor feed lines for receiving a reactor fluid flow, a measurement line, and a valve system. The valve system includes one or more valves and a valve control unit for controlling the one or more valves, the valve system being arranged and/or adapted such that it can assume a measurement setting in which the valves redirect one of the reactor feed flows such that it flows through the measurement line.

14 Claims, 20 Drawing Sheets

(56) References Cited

U.S. PATENT DOCUMENTS

| | | | |
|---|---|---|---|
| 8,449,847 B2 * | 5/2013 | Haas et al. | 422/608 |
| 2004/0121470 A1 | 6/2004 | Fung et al. | |
| 2004/0131515 A1 | 7/2004 | Alexanian et al. | |
| 2005/0169815 A1 * | 8/2005 | van den Brink et al. | 422/130 |
| 2011/0053797 A1 * | 3/2011 | Haas et al. | 506/11 |

* cited by examiner

SYSTEM AND METHOD FOR MEASURING FLOW RATES OF FLUID FLOWS TO PARALLEL REACTORS

CROSS-REFERENCE TO RELATED APPLICATIONS

This application is the National Stage of International Application No. PCT/NL2011/050665, filed Oct. 3, 2011, which claims the benefit of Netherlands Application No. 2005476, filed Oct. 7, 2010, and U.S. Provisional Application No. 61/390,755, filed Oct. 7, 2010, the contents of all of which are incorporated by reference herein.

FIELD OF THE INVENTION

The inventions pertains to a system and method for measuring flow rates of parallel fluid flows.

BACKGROUND OF THE INVENTION

In research into chemical reactions, high throughput experimentation is widely used. In high throughput experimentation, a plurality of relatively small scale reactors is placed in parallel. In each reactor, a different experiment takes place. Usually, conditions and/or reactants are varied slightly over the different reactors. For example all reactors are operated at the same pressure and temperature, but all contain a different reactant, or the reactants are all the same, but pressure and temperature are varied. After the experiments are carried out, the results of the experiments are compared with each other, and for example interesting reactants (e.g. catalysts) or promising reaction conditions are identified. Carrying the experiments out in parallel leads to a significant reduction in the time it takes to come up with experimentation results.

Usually, in high throughput experimentation, the reactors are small, as are the amounts of reactants that are used. If flow through reactors are used, the flow rates of the fluid flows are also low. Typical reactor sizes do not exceed 1 cm in diameter, and when for example catalytic activity is tested, typically a few grams of a potential catalyst are present in each reactor. Sometimes even less potential catalyst is used, e.g between 0.005 and 1 gram. Flow rates are usually less then 10 ml/hour for liquids and/or less than 150 Nml/minute for gas. The typical low flow rate used in high throughput reactions makes controlling the fluid flow through the individual reactors hard.

In order to be able to compare the results of the experiments that are carried out in the different reactors with each other, it is important to know the process conditions under which each experiment took place. Such process conditions include e.g. temperature, pressure and flow rate.

WO99/64160 aims at keeping the flow rate the same through all reactors by providing a passive flow restrictor upstream or downstream of each reactor. The resistance to fluid flow in each restrictor is so high that it is the restrictor that determines the flow rate through each reactor. Passive flow controllers usually are cheaper and compacter than active flow controllers. On the other hand, active flow controllers allow for adjustment of the flow during the experiment, without having to interrupt the experiment.

A disadvantage of using flow restrictors as passive flow controllers to control flow rate through the reactors is that all flow restrictors have to be calibrated individually in order to obtain the desired flow distribution over the reactors. When for example capillaries are used as flow restrictors, the length of the capillaries has to be changed in order to get the right resistance to fluid flow. This is labour intensive.

U.S.2004/0121470 describes a method and apparatus for high throughput catalysts screening and optimization. In this method and device, multiple parallel reactors are provided, but the experiments take place sequentially. While one reactor is fed with a reactant gas and/or liquid, the other reactors are fed with an inert fluid, and/or a fluid for pre-treatment, regeneration or the like. The effluent coming from the reactor in which the experiment takes place is supplied to an analyzer. When the experiment is done, a different reactor is fed with the reactant fluid and the previously active reactor receives the other fluid (inert, pre-treatment, regeneration, etc.).

The known apparatus comprises a rotary valve upstream of the reactors, which valve ensures that the reactant fluid is directed to one reactor and the other fluid (inert, pre-treatment, regeneration, etc.) is directed to the other reactors. So, in the known apparatus, the valve upstream of the reactors is used to determine which reactor receives which fluid.

The object of the invention is to provide an improved system and method measuring flow rates of parallel fluid flows.

This object is achieved with the systems and the methods of the present invention.

In accordance with the invention, a fluid flow is distributed over a plurality of reactors. These reactors are preferably flow through reactors, but it is also possible to use the invention during the filling of a plurality of batch reactors.

The flow can be distributed equally over the reactors, but it is also possible that a different flow distribution is desired, e.g. the first reactor receiving x ml/min, the second reactor receiving 2x ml/min, the third reactor receiving 3x ml/min etc. The skilled person will understand that any predetermined flow distribution can be used in the invention.

In accordance with the invention, a common feed line branches out into a plurality of reactor feed lines. The reactor feed lines receive fluid from the common feed line. Through the common feed line flows a combined fluid flow, which is split into reactor feed flows, each of which reactor feed flows flowing to a reactor. The fluid of the combined feed flow and the reactor feed flows can be gas, liquid or a combination thereof. Each reactor feed line leads the received fluid to the reactor that is connected said reactor feed line. It is possible that multiple reactor feed lines are connected to each reactor. This makes it for example possible to supply both a liquid and a gas to the reactors.

In addition to the reactor feed lines, the system also comprises a measurement line. The measurement line branches out, such that it has multiple outlets. Each outlet is connected to an associated reactor feed line.

In a first embodiment, the measurement line has a single inlet. In this embodiment, the measurement line inlet is connected to the common feed line.

In a second embodiment, the measurement line has multiple inlets. In this embodiment, each of the measurement line inlets is connected to an associated reactor feed line. In each reactor feed line, the connection with the measurement line inlet is arranged upstream of the connection with the measurement line outlet.

In the measurement line, a first flow sensor is arranged. This flow sensor is adapted to measure the flow rate of the fluid flowing through the measurement line. The flow sensor can be any suitable kind of flow sensor. It is however preferred that a flow sensor is used that has a low resistance to fluid flow, such as a flow sensor that is based on the time of flight principle. It is also possible to use other suitable types of flow sensors.

Further, the system according to the invention comprises a valve system. The valve system comprises one or more valves and a valve control unit for controlling the one or more valves, in particular controlling the setting of the one or more valves. The valve system is arranged and/or adapted such that it can assume a non-measurement setting which allows the fluid coming from the common feed line to flow into the reactor feed lines that are connected to the common feed line and via the reactor feed lines into the reactors. In this non-measurement setting, the fluid flows flow through the entire reactor feed lines. When the valve system is in its non-measurement setting, the flow rate is not measured by the flow sensor in the measurement line.

The valve system can also assume a measurement setting, in which the valves redirect one of the reactor feed flows such that it flows through the measurement line. While this redirected reactor feed flow flows through the measurement line, the reactor feed line it would flow through when the valves were in their non-measurement setting, is blocked. This (temporarily) blocked reactor feed line is bypassed completely or partly by the measurement line.

When the valve system is in its measurement setting, the valve control unit preferably changes the settings of the valve or valves such that sequentially, one after the other, fluid flowing to or into each reactor feed line is redirected to flow through the measurement line and that the redirected flow flows through the measurement line. So, one after the other, the flow rate of the fluid flow of one reactor feed line is measured by the first flow sensor.

During a measurement cycle, each reactor feed flow is redirected through the measurement line once. So, one after the other, the flow rate of each reactor feed flow is measured by the flow sensor in the measurement line.

Preferably, a plurality of measurement cycles is carried out during the course of the experiments. There can be a time interval between successive measurement cycles, or the measurement cycles can be performed right after each other. Also, there can be a time interval between the measurements in a measurement cycle, or the measurements in a measurement cycle can be performed one right after the other.

The valve system can comprise any suitable kind of valve. It is possible to use individual valves for each individual line (each valve having a single inlet and a single outlet), but it is also possible that rotary valves are used which act on the fluid flows in or to a plurality of lines at the same time. Such a rotary have has therefore multiple inlets and multiple outlets.

An advantage of the system and method according to the invention is that only the measurement line needs to be provided with a flow sensor but still the flow rates in all individual reactor feed lines can be measured. This of course reduces the costs as less flow sensors have to be present. An other important advantage in using a flow sensor only in the measurement line is that all measurement are carried out by the same flow sensor. Therewith, extensive calibration is no longer necessary. If multiple flow sensors are used, one in each reactor feed line, and you would want to compare the flow rates of the different reactor feed lines, you must make sure that the readings of all flow sensors are accurate enough for a reliable comparison. In practice, this boils down to that all flow sensors have to be individually calibrated against the same standard. In the system and method according to the invention this is no longer necessary, as for all measurements the same flow sensor is used.

In a possible embodiment, the flow rate is not just measured in the measurement line, but also the flow rate through the common feed line is determined. This flow rate can be measured by a flow sensor of any suitable type that is arranged in the common feed line. In practice it has been found that a coriolis flow sensor works well. Alternatively (or even in addition) a simple mass gauge can be used that measures the reduction of the mass of the fluid source that is caused by the fluid flowing out of the fluid source. The mass reduction over time can be correlated to the flow rate of the fluid out of the fluid source and into the common feed line.

In a further possible embodiment, in addition to the measurement line upstream of the reactors, a second measurement line is present downstream of the reactors. This second measurement line has multiple inlets. Each inlet of the measurement line is connected to one of the effluent lines coming out of a reactor.

In such an embodiment, second valves and a second valve controller are present to make sure that flow is redirected from a first effluent line through the second measurement line so that its flow rate can be measured. Successively, the flow of each effluent line is directed through the second measurement line such that all flow rates can be determined. This information can for example be used to determine catalyst activity or reaction efficiency.

In an advantageous embodiment, the measurement system according to the invention is used in the control of the flow rates of the fluid flows to the reactors.

In such an embodiment, each reactor feed line comprises a flow controller. This flow controller is an active flow controller, which means that the flow rate of the fluid flow passing through it can be adjusted without having to interrupt the experiment. Examples of suitable active flow controllers are heat controlled flow restrictors (e.g. heat controlled capillaries or heat controlled pinholes), needle valves or mass flow controllers.

Such an embodiment further comprises a flow control unit for controlling the flow rate of the fluid flow through the reactor feed lines. The setting of the flow controllers in the reactor feed lines is determined on the basis of the measurement results of the first flow sensor that is arranged in the measurement line.

In a further embodiment it is possible that two or more flow sensors are arranged in the measurement line. These two flow sensors can be arranged in series or in parallel.

For example, one flow sensor can serve as a redundant flow sensor, a back up in case the other one fails. In such a system, it is advantageous to arrange the flow sensors in parallel, and have a valve system that directs the full flow through the measurement line through one of the flow sensors. Should this flow sensor fail, the valve system changes the setting of the valves such that the flow is directed through the other sensor. The failed sensor can then be replaced without shutting down the system, and therewith without having to interrupt the experiments.

As an alternative or in additional, two or more flow sensors can be arranged in parallel in the measurement line. The flow sensors can be used as a double check, or they can have a different measurement range.

BRIEF DESCRIPTION OF THE DRAWINGS

The invention will be explained in more detail under referral to the drawings, in which non-limiting embodiments of the invention are shown. The drawings show in.

DETAILED DESCRIPTION OF THE INVENTION

Figure 1:
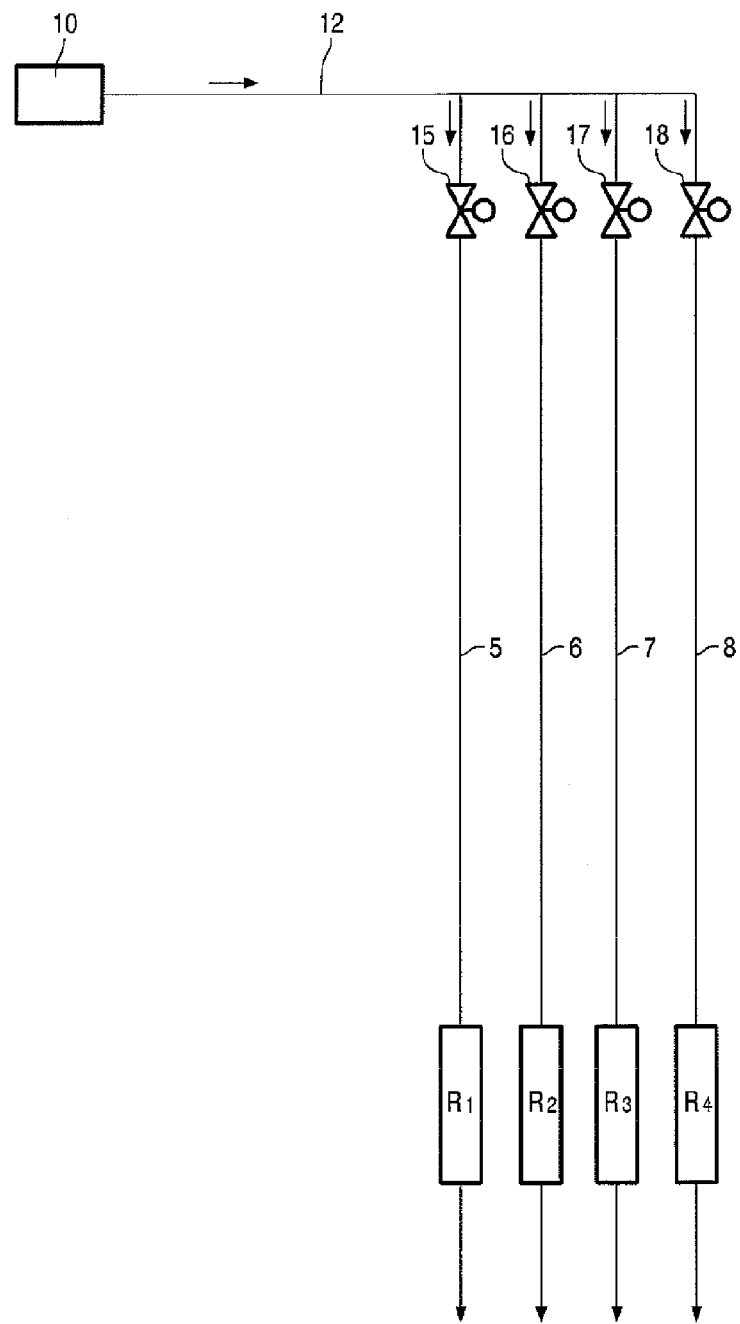
FIG. 1: a system for performing parallel experiments as known from the prior art.

FIG. 1 shows a system for performing parallel experiments as is known from the prior art. The known system comprises four reactors R1, R2, R3, R4 that are arranged in parallel. In the example of FIG. 1, the reactors R1, R2, R3, R4 are flow through reactors. A fluid source 10 is present for supplying a fluid to the parallel reactors R1, R2, R3, R4. The fluid can be a gas, a liquid of a combination of a gas and a liquid. The fluid feed source can for example be a pressurized container or reservoir, or a reservoir in combination with a pump or compressor.

The fluid leaves the fluid source 10 by a common feed line 12. The fluid flow leaving the fluid source 10 is indicated as the "combined feed flow". To the common feed line 12, four reactor feed lines 5,6,7,8 are connected. The combined feed flow is split over these four reactor feed lines 5,6,7,8. Each of the reactor feed lines 5,6,7,8 takes a part of the combined feed flow to one of the reactors R1, R2, R3, R4. The part of the combined feed flow that flows to one reactor is indicated as "the reactor feed flow".

Each reactor feed line 5,6,7,8 has been provided with a valve 15,16,17,18. The valves allow to open or close the reactor feed line they are arranged in.

It is possible that the known system comprises a plurality of fluid sources, and that each reactor receives fluid from two or more fluid sources at the same time.

In a possible embodiment of the known system of FIG. 1, active or passive flow controllers are arranged in the reactor feed lines. It is also possible, as an alternative or in addition, that active or passive flow controllers are arranged in the system downstream of the reactors.

In each of the reactors R1, R2, R3, R4, a different reaction takes place. For example, each reactor is provided with a different substance, which substance could be a potential catalyst. A gas, liquid or combination thereof is led from the fluid source 10, via the common feed line 12 and one of the reactor feed lines 5,6,7,8 to one of the reactors R1, R2, R3, R4. The reactor effluent of each of the reactors is analysed by an analyser (not shown in FIG. 1). In one embodiment the reactor effluent of each reactor is received in a separate receptacle for off line analysis. In a different embodiment, the reactor effluent is lead to a selector valve, which leads the effluent either to an analyzer or to waste. In a further different embodiment, each effluent stream is simultaneously directed to an on line analyzer.

The skilled person will understand that instead of four reactors, any other number of reactors (each with an associated reactor feed line) can be used.

Figure 2:
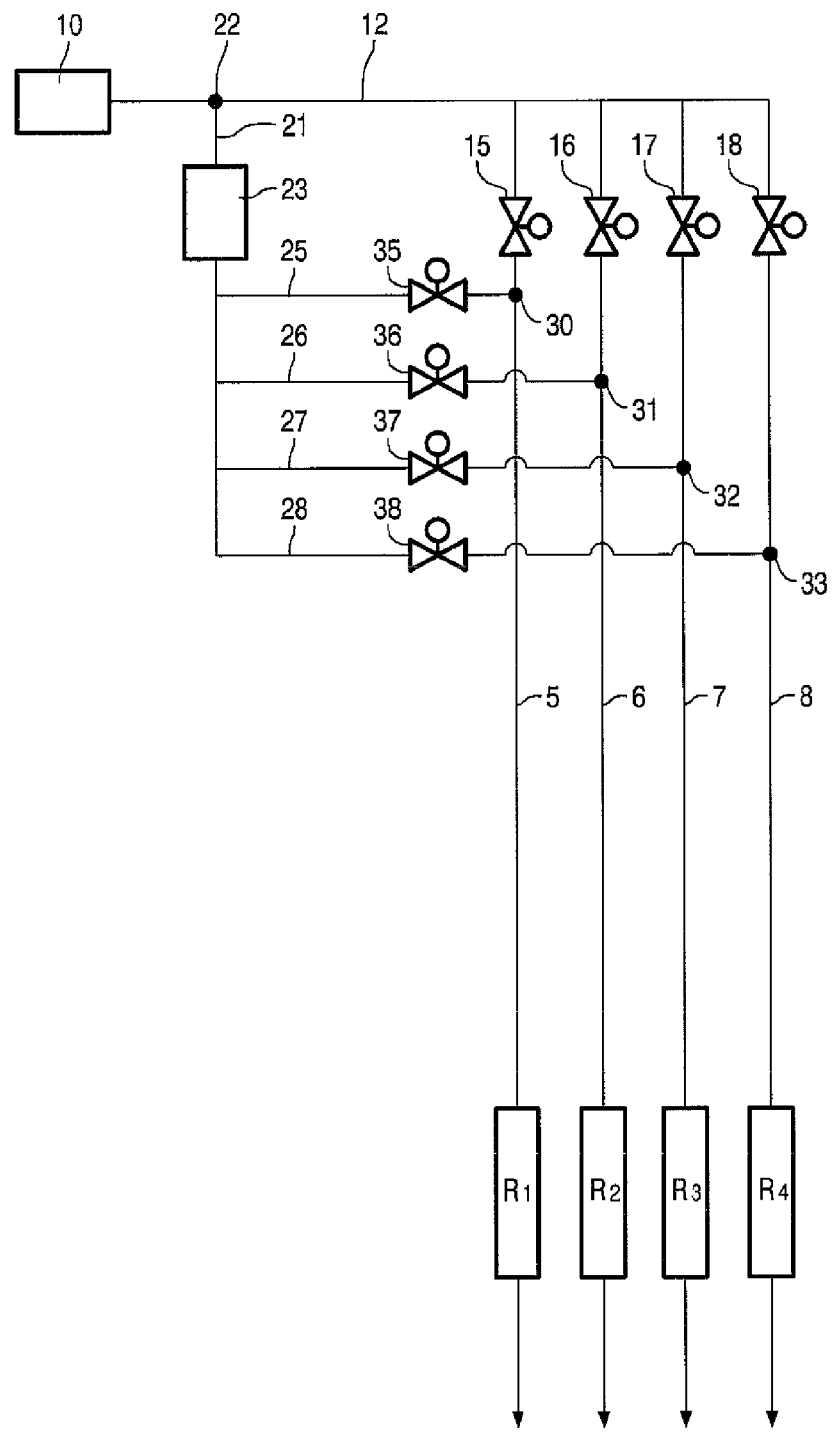
FIG. 2: a first embodiment of a system according to the invention in an idle state.

FIG. 2 shows a first embodiment of a system according to the invention in an idle state. In comparison with the known system of FIG. 1, measurement line 21 has been added. In the embodiment of FIG. 2, the measurement line 21 has a single measurement line inlet 22. The measurement line inlet 22 is connected to the common feed line 21. Therewith, it is in fluid communication with the fluid source 10.

In the embodiment of FIG. 2, the measurement line 21 has four measurement line outlets 30,31,32,33. Each measurement line outlet is connected to an associated reactor feed line 5,6,7,8. The connection to a measurement line outlet 30,31, 32,33 is arranged downstream of the valve 15,16,17,18 of the respective reactor feed line 5,6,7,8. The connection between a measurement line outlet 30,31,32,33 and a reactor feed line 5,6,7,8 makes that the measurement line 21 is in fluid communication with the reactor feed lines 5,6,7,8.

In the embodiment of FIG. 2, the measurement line 21 branches out to the four measurement line outlets 30,31,32, 33. In each branch 25, 26, 27, 28, a valve 35,36,37,38 is arranged, upstream of the measurement line outlet 30,31,32, 33.

In the part of the measurement line upstream of the branches, a flow sensor 23 is arranged. This flow sensor 23 is adapted to measure the flow rate of the fluid flow passing through the measurement line 21. The flow sensor 23 can be any suitable kind of flow sensor, but preferably a type of flow sensor is used that has a resistance to fluid flow that is low in comparison with other flowed through elements of the system, such that the flow sensor does not alter the ratio of the flow rates flowing to the reactors when the valves 15,16,17,18 in the reactor feed lines and/or the valves 35,36,37,38 in the measurement line are operated (which could occur if the flow rate of the common feed line would be kept at a fixed rate). Flow sensors that are based on the time-of-flight principle or thermal flow sensors have proven to be particularly suitable.

The skilled person will understand that any number of reactors can be used in the system of FIG. 2, with the corresponding number of reactor feed lines (each with a valve), measurement line outlets and measurement line branches (each with a valve).

The skilled person will also understand that the different types of analysis set ups as described in relation with FIG. 1 can also be used in the system of FIG. 2.

FIGS. 3A-3E show the system of FIG. 2 during successive steps of a measurement cycle.

Figure 3A:
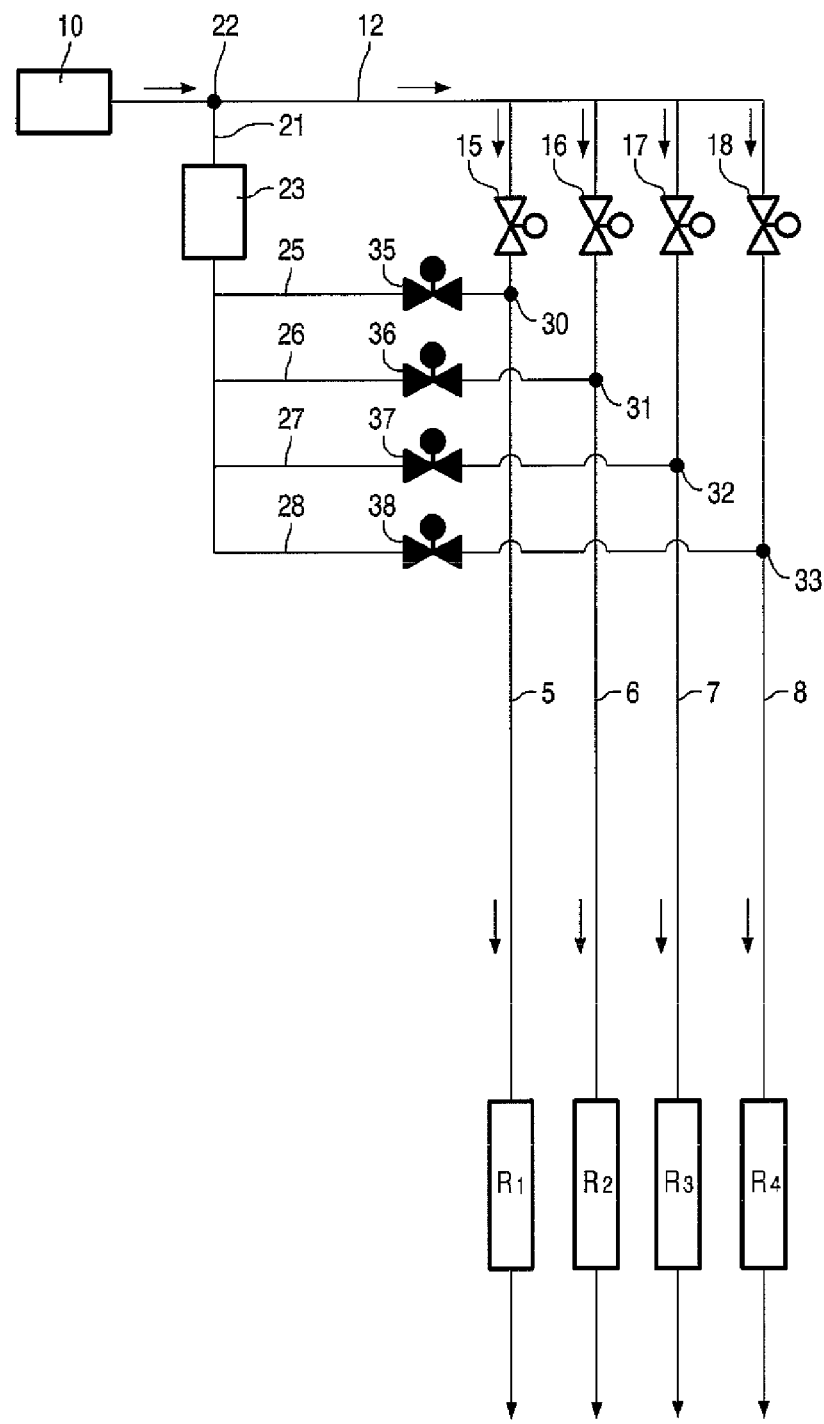
FIGS. 3A-3E: the system of FIG. 2 during successive steps of a measurement cycle.

FIG. 3A shows the system of FIG. 2 just before the start of a measurement cycle. The valves 35,36,37,38 in the branches 25,26,27,28 of the measurement lines are all closed and the valves 15,16,17,18 in the reactor feed lines 5,6,7,8 are all open. The combined feed flow is split into four reactor feed flows. Each reactor feed flow flows through a reactor feed line to a reactor. The arrows in FIG. 3A indicate the fluid flows.

Figure 3B:
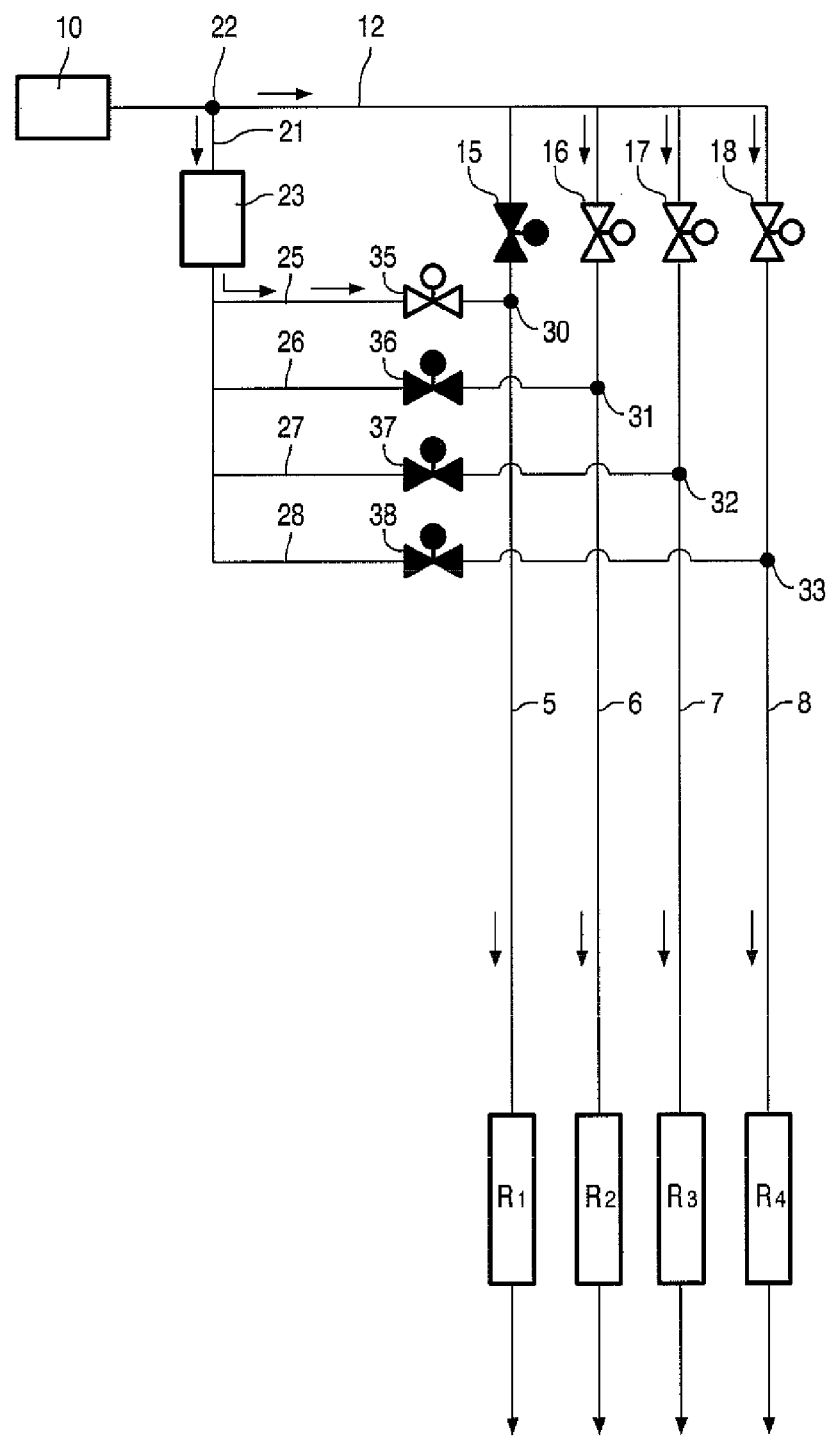

FIG. 3B shows the first step of a measurement cycle. The valve 35 in the branch 25 of the measurement line that is connected to the first reactor feed line 5 is open, and the valve 15 in the first reactor feed 5 line is closed. The valves 36,37,38 in the other branches 26,27,28 of the measurement line remain closed and the valves 16,17,18 in the other reactor feed lines 6,7,8 remain open.

Due to this setting of the valves, the combined feed fluid is still split into four reactor feed flows, but due to valve 15 blocking reactor feed line 5, one reactor feed flow is directed through the measurement line 21 and the last part of reactor feed line 5 instead of just through the (entire) reactor feed line 5. The flow sensor 23 in the measurement line 21 measures the flow rate of this redirected reactor feed flow. The arrows in FIG. 3B show the fluid flows. In a variant to this embodiment, the outlet 30 of branch 25 of the measurement line 21 is connected directly to reactor R1, so that the redirected reactor feed flow bypasses reactor feed line 5.

The resistance to fluid flow in the measurement line 21 and the flow sensor 23 is preferably such that the switching of the setting of the valves does not influence the distribution of the combined feed flow over the reactors during any of the steps in the measurement cycle.

Figure 3C:
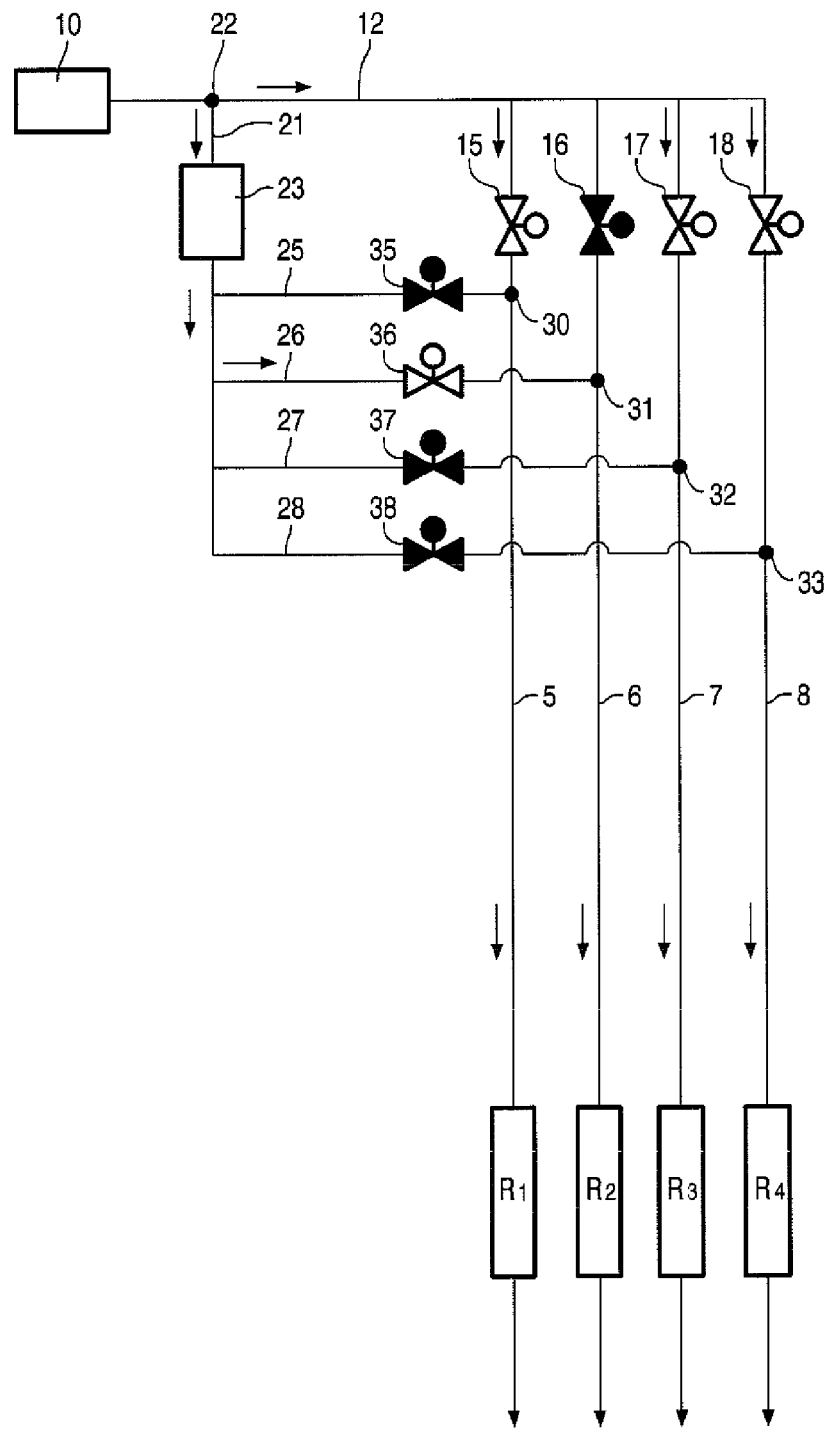

FIG. 3C shows the second step in the measurement cycle. The valve 35 in the branch 25 of the measurement line that is connected to the first reactor feed line 5 is closed again, but now the valve 36 in the branch 26 of the measurement line that is connected to the second reactor feed line 6 is open. Likewise, the valve 15 in the first reactor feed line is opened again, but the valve 16 in the second reactor feed line 6 is closed.

With this setting of the valves, the combined feed fluid is still split into four reactor feed flows, but due to valve 16 blocking reactor feed line 6, one of them is directed through the measurement line 21 and the last part of reactor feed line 6 instead of just through the (entire) reactor feed line 6. The flow sensor 23 in the measurement line 21 measures the flow rate of this redirected reactor feed flow. The arrows in FIG. 3C show the fluid flows. In a variant to this embodiment, the outlet 31 of branch 26 of the measurement line 21 is connected directly to reactor R2, so that the redirected reactor feed flow bypasses reactor feed line 6.

Figure 3D:
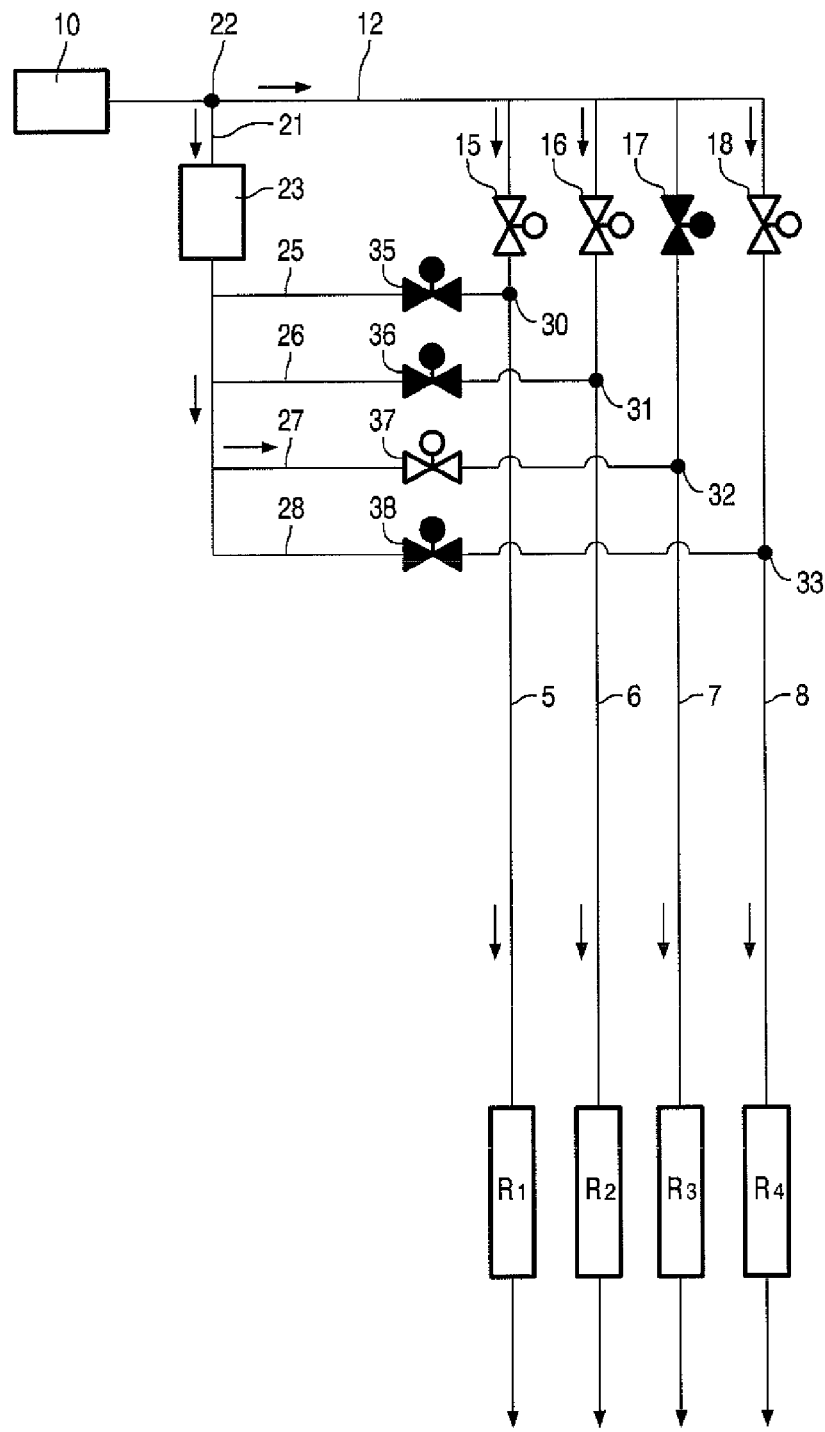

FIG. 3D shows the third step in the measurement cycle. The valve 36 in the branch 26 of the measurement line that is connected to the second reactor feed line 6 is closed again, and the valve 37 in the branch 27 of the measurement line that is connected to the third reactor feed line 7 is open. Likewise, the valve 16 in the second reactor feed line 6 is opened, and the valve 17 in the third reactor feed line 7 is closed.

With this setting of the valves, the combined feed fluid is still split into four reactor feed flows, but due to valve 17 blocking reactor feed line 7, one of them is directed through the measurement line 21 and the last part of reactor feed line 7 instead of just through the (entire) reactor feed line 7. The flow sensor 23 in the measurement line 21 measures the flow rate of this redirected reactor feed flow. The arrows in FIG. 3D show the fluid flows. In a variant to this embodiment, the outlet 32 of branch 27 of the measurement line 21 is connected directly to reactor R3, so that the redirected reactor feed flow bypasses reactor feed line 7.

Figure 3E:
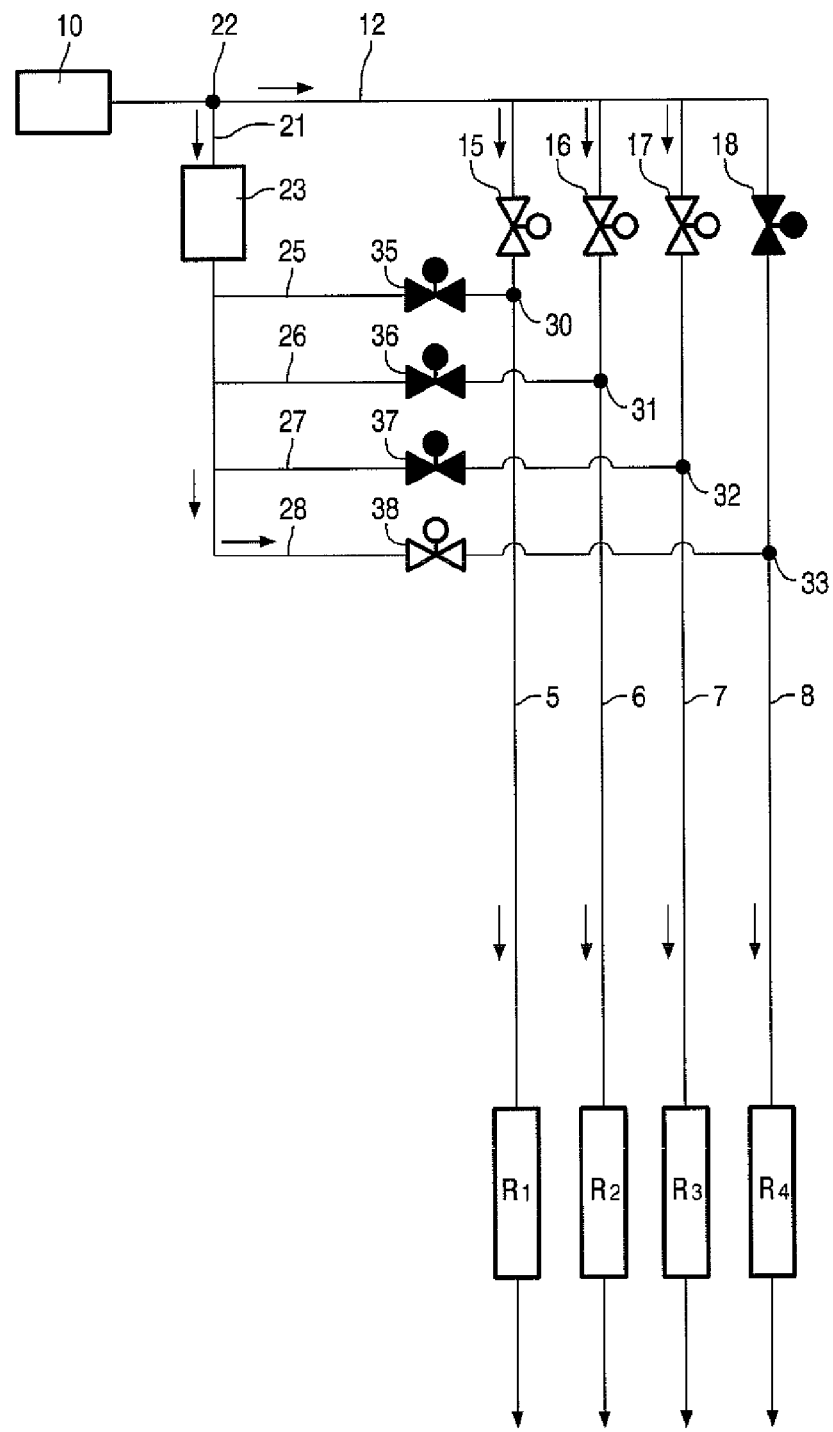

FIG. 3E shows the fourth step in the measurement cycle. The valve 37 in the branch 27 of the measurement line that is connected to the third reactor feed line 7 is closed again, and the valve 38 in the branch 28 of the measurement line that is connected to the fourth reactor feed line 8 is open. Likewise, the valve 17 in the third reactor feed line 7 is opened, and the valve 18 in the fourth reactor feed line 8 is closed.

With this setting of the valves, the combined feed fluid is still split into four reactor feed flows, but due to valve 18 blocking reactor feed line 8, one of them is directed through the measurement line 21 and the last part of reactor feed line 8 instead of just through the (entire) reactor feed line 8. The flow sensor 23 in the measurement line 21 measures the flow rate of this redirected reactor feed flow. The arrows in FIG. 3E show the fluid flows. In a variant to this embodiment, the outlet 33 of branch 28 of the measurement line 21 is connected directly to reactor R4, so that the redirected reactor feed flow bypasses reactor feed line 8.

After the fourth step in the measurement cycle, the system can return to the non-measuring state of FIG. 3A, or it can continue measuring by starting another measurement cycle. In the latter case, the system will return to the state of FIG. 3B.

Figure 4:
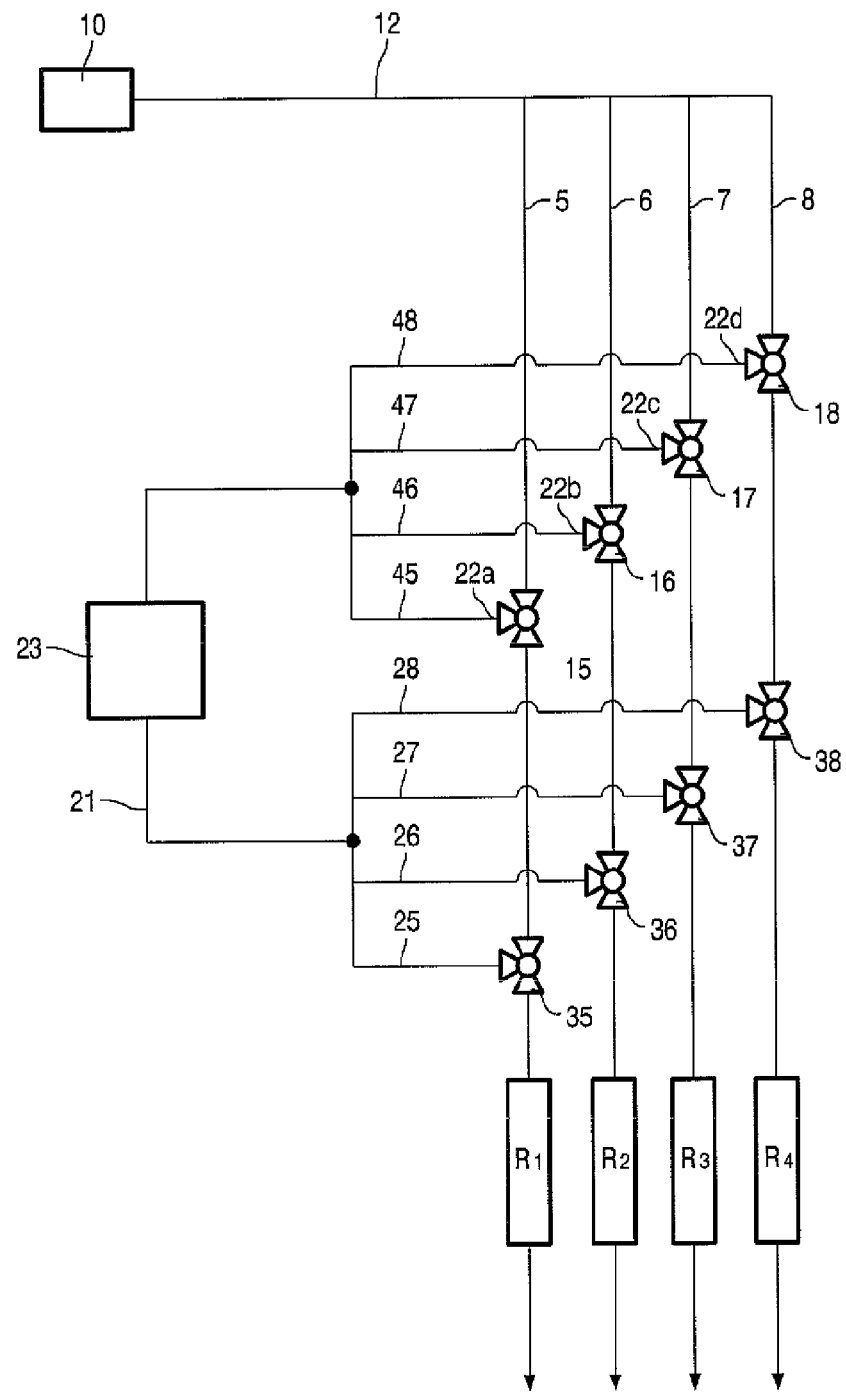
FIG. 4: a second embodiment of the system according to the invention.

FIG. 4 shows a second embodiment of the system according to the invention.

In the embodiment of FIG. 4, the measurement line has a plurality of measurement line outlets like in the embodiment of FIG. 2, but it also has a plurality of measurement line inlets 22a,22b,22c,22d. In the embodiment of FIG. 4, the measurement line has inlet branches 45,46,47,48 as well was outlet branches 25,26,27,28. Each measurement line inlet is connected to one of the reactor feed lines 5,6,7,8.

In the embodiment of FIG. 4, the valves 15,16,17,18 and the valves 35,36,37,38 are three way valves (one inlet, two outlets; one outlet open, one outlet closed). This allows the embodiment of FIG. 4 to be operated in the same way as the embodiment of FIG. 2.

The skilled person will understand that any number of reactors can be used in the system of FIG. 4, with the corresponding number of reactor feed lines (each with a valve), measurement line outlets and measurement line branches (each with a valve).

The skilled person will also understand that the different types of analysis set ups as described in relation with FIG. 1 can also be used in the system of FIG. 4.

In comparison with the embodiment of FIG. 2, the inlet of the measurement line in the embodiment of FIG. 4 is arranged further downstream into the system. So, when the same pressure in the fluid source is used, the embodiment of FIG. 4 allows the measurement line and the flow sensor arranged therein to be operated at lower pressures. The pressure in the measurement line can—in both embodiments—be further reduced by arranging a flow restrictor upstream of the inlet of the measurement line.

FIGS. 5A-5E show the measurement cycle in the embodiment of FIG. 4.

Figure 5A:
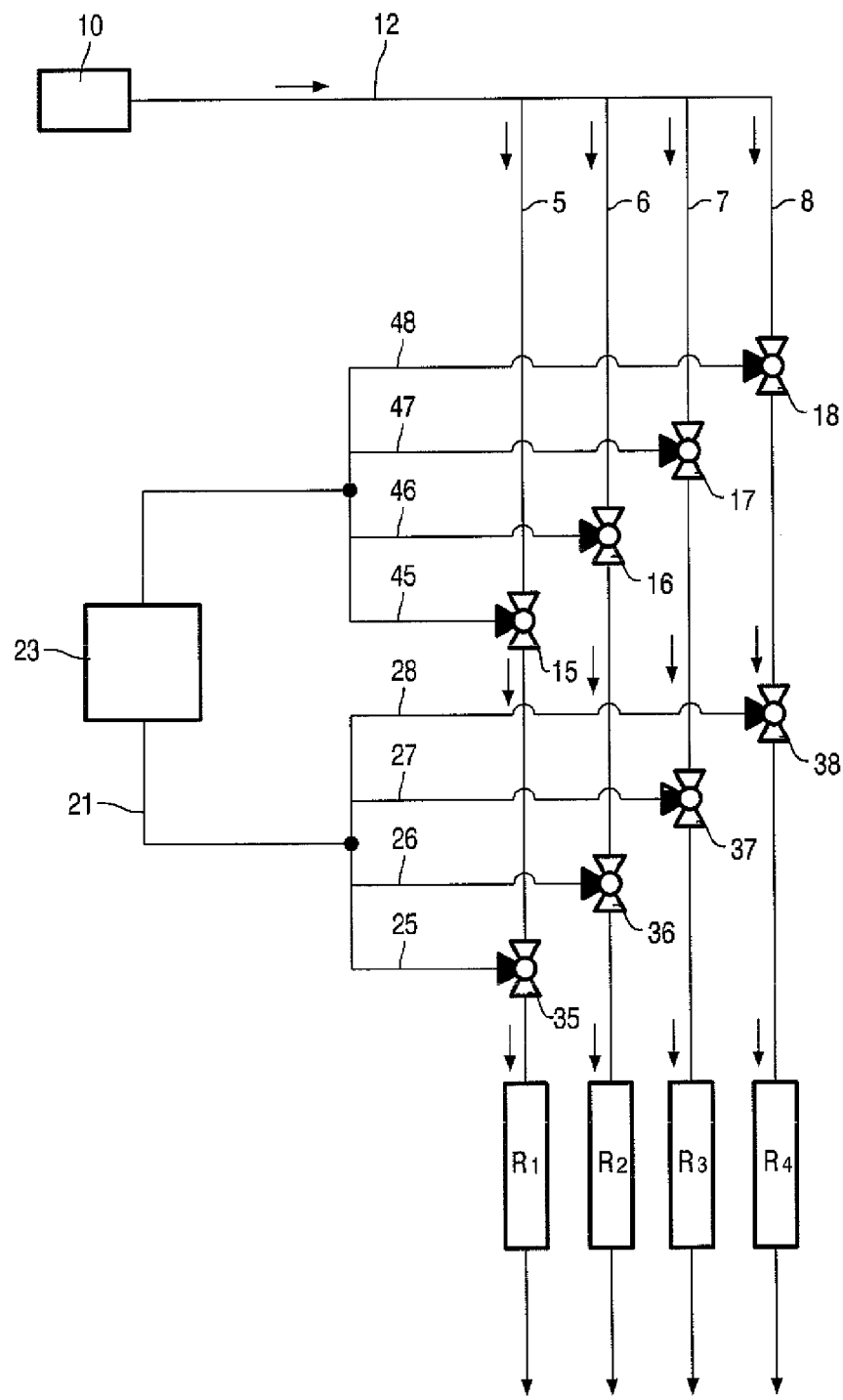
FIGS. 5A-5E: the measurement cycle in the embodiment of FIG. 4, FIG. 6: a variant of the embodiment of FIG. 2, FIG. 7: a variant of the embodiment of FIG. 4, FIG. 8: a variant of the embodiment of FIG. 2, FIG. 9: a variant of the embodiment of FIG. 2, FIG. 10: a further embodiment in the invention.

FIG. 5A shows the system of FIG. 4 just before the start of a measurement cycle. The valves 15,16,17,18 and the valves 35,36,37,38 are all set such that no fluid flows through the measurement line 21. The combined feed flow is split into four reactor feed flows. Each reactor feed flow flows through a reactor feed line to a reactor. The arrows in FIG. 5A indicate the fluid flows.

Figure 5B:
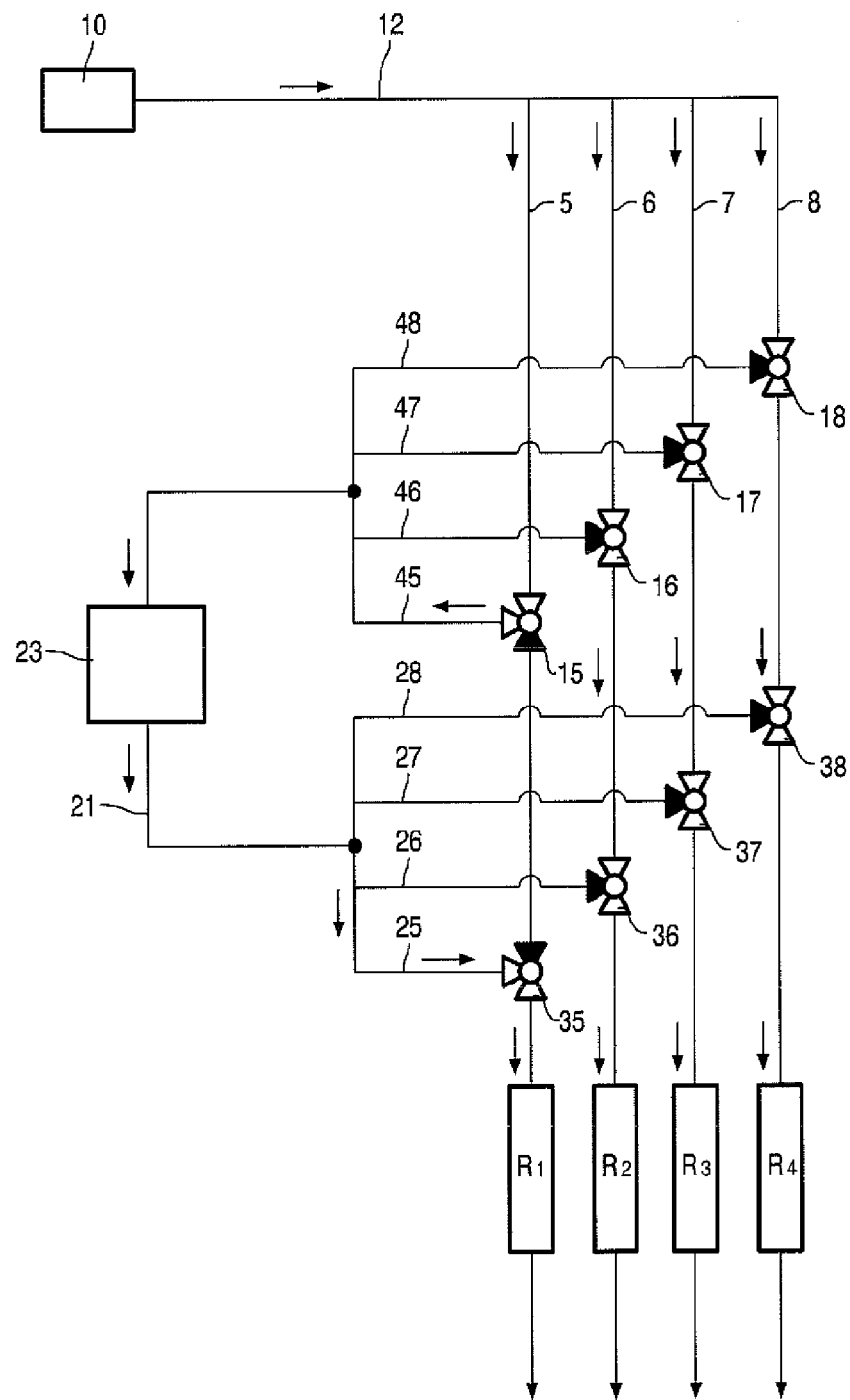

FIG. 5B shows the first step of a measurement cycle. In this first step, the valves are set such that the fluid flowing through the first reactor feed line 5 bypasses a part of this first reactor feed line 5. During this bypassing, the fluid flow flows through first inlet branch 45 of the measurement line 21, through the flow sensor 23, and through the first outlet branch 25 of the measurement line back into the first reactor feed line 5. During the passage of the fluid flow through the flow sensor 23, the flow rate is measured.

Figure 5C:
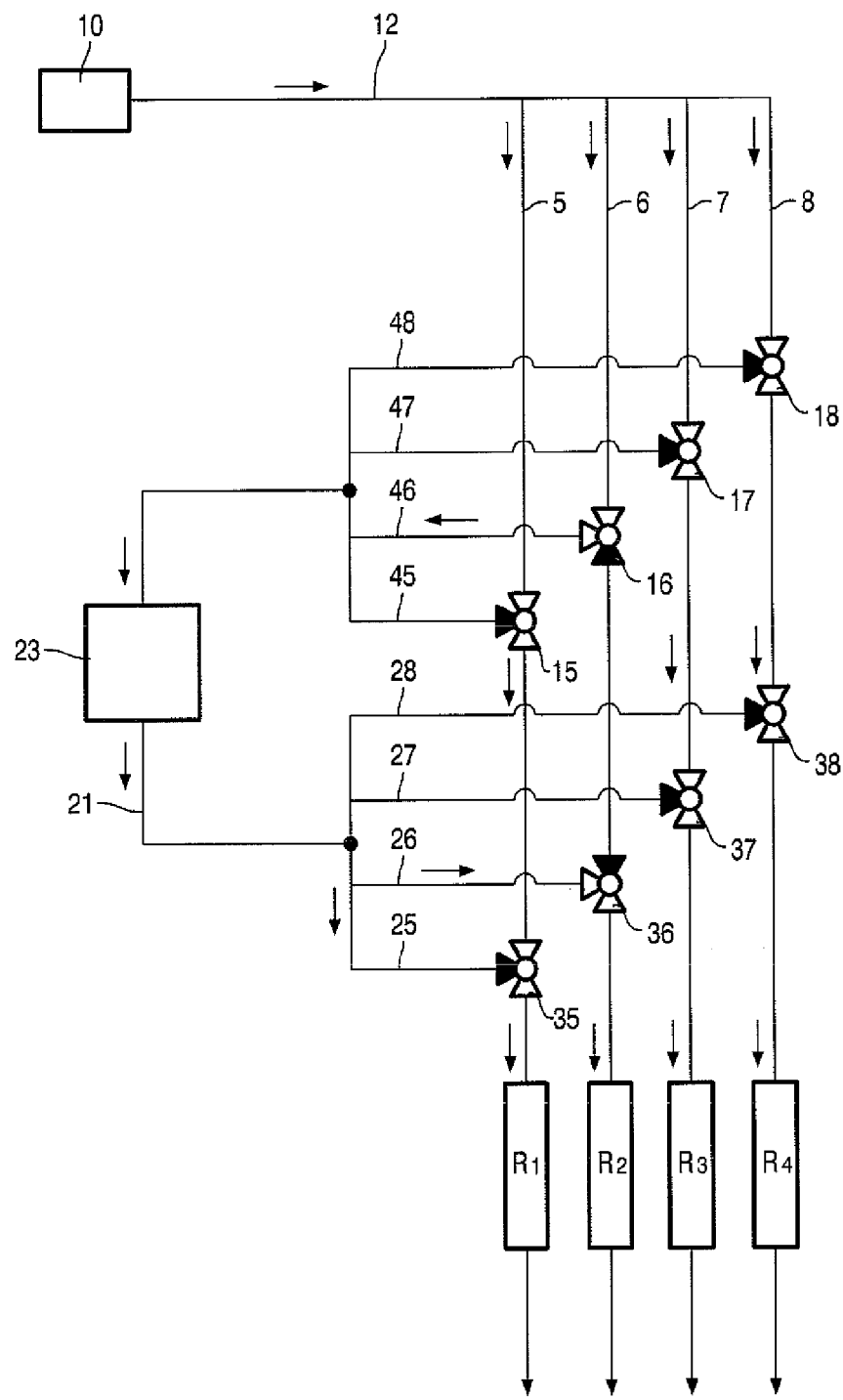

FIG. 5C shows the second step of a measurement cycle. In this second step, the valves are set such that the fluid flowing through the second reactor feed line 6 bypasses a part of this second reactor feed line 6. During this bypassing, the fluid flow flows through second inlet branch 46 of the measurement line 21, through the flow sensor 23, and through the second outlet branch 26 of the measurement line back into the second reactor feed line 6. During the passage of the fluid flow through the flow sensor 23, the flow rate is measured.

Figure 5D:
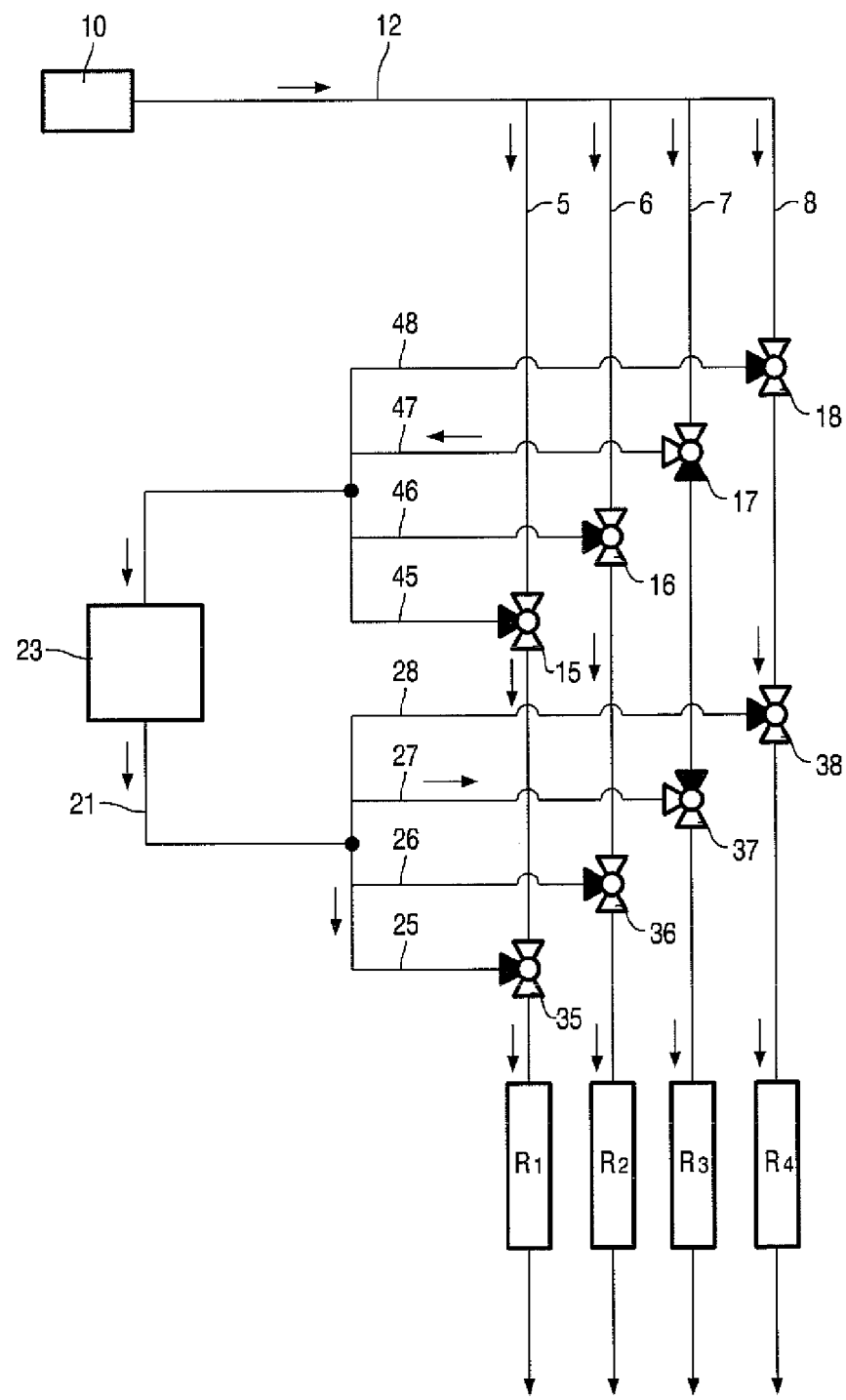

FIG. 5D shows the third step of a measurement cycle. In this third step, the valves are set such that the fluid flowing through the third reactor feed line 7 bypasses a part of this third reactor feed line 7. During this bypassing, the fluid flow flows through third inlet branch 47 of the measurement line 21, through the flow sensor 23, and through the third outlet branch 27 of the measurement line back into the third reactor feed line 7. During the passage of the fluid flow through the flow sensor 23, the flow rate is measured.

Figure 5E:
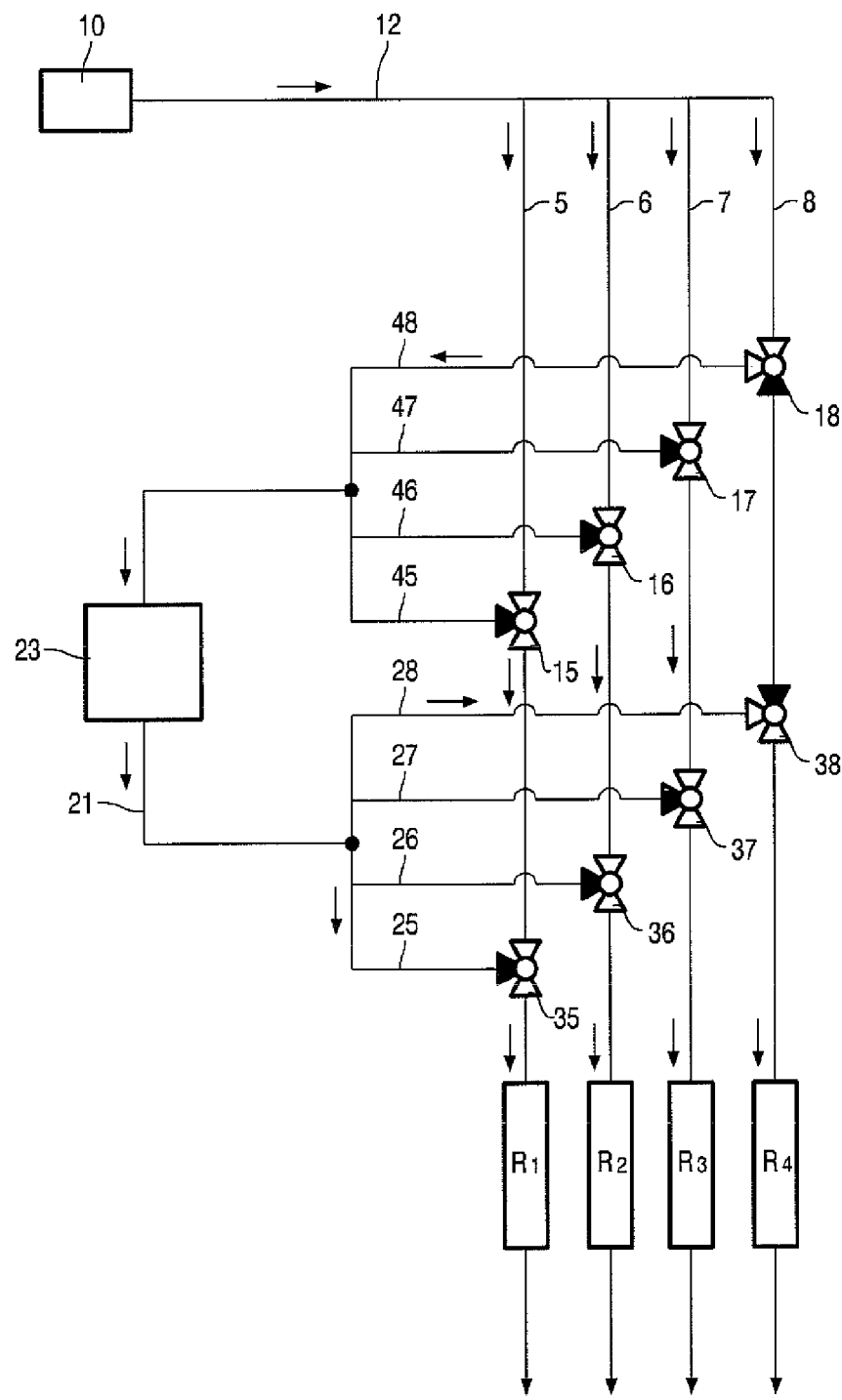

FIG. 5E shows the fourth step of a measurement cycle. In this fourth step, the valves are set such that the fluid flowing through the fourth reactor feed line 8 bypasses a part of this fourth reactor feed line 8. During this bypassing, the fluid flow flows through fourth inlet branch 48 of the measurement line 21, through the flow sensor 23, and through the fourth outlet branch 28 of the measurement line back into the fourth reactor feed line 8. During the passage of the fluid flow through the flow sensor 23, the flow rate is measured.

After the fourth step in the measurement cycle, the system can return to the non-measuring state of FIG. 5A, or it can continue measuring by starting another measurement cycle. In the latter case, the system will return to the state of FIG. 5B.

In the embodiments of FIG. 2 and FIG. 4, a plurality of valves are used to make the right fluid connections during the various steps of the measurement cycle. Instead of such a plurality of valves, valves with multiple inlets and outlets, e.g. rotary valves, can be used. A suitable valve of this kind that can be used in systems according to the invention is for example the type EMT4CSC8MWE of Vici.

Figure 6:
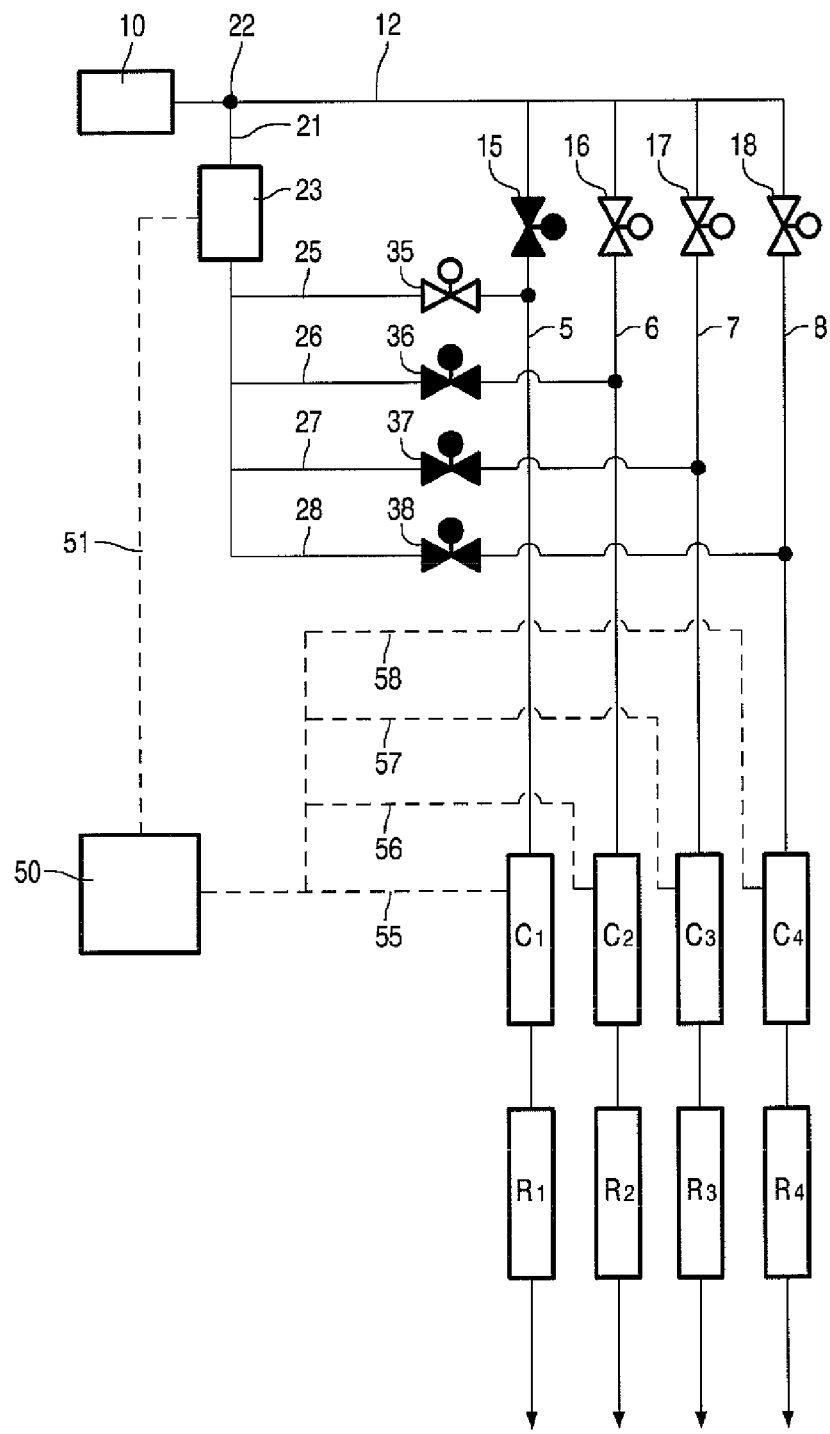

FIG. 6 shows a variant of the embodiment of FIG. 2. In this variant, the flow sensor 23 of the measurement line 21 is used in a control loop for controlling the flow rate of the reactor feed flows.

FIG. 6 shows the valve setting during the first step of the measurement cycle. The skilled person will understand that the control loop is not limited to this step of the measurement cycle.

In the embodiment of FIG. 6, each reactor feed line is provided with a flow controller C1,C2,C3,C4. These flow controllers are active flow controllers, so that their setting can be changed during the course of the experiments without having to interrupt the experiments.

The embodiment of FIG. 6 further comprises a flow control unit 50. This flow control unit 50 receives flow measurement data form the flow sensor 23 through a data input connection 51. This data input connection 51 can be a wire, but it can also be a wireless connection.

The flow control unit 50 controls the settings of the flow controllers C1,C2,C3,C4 through control connections 55,56, 57,58. These control connected can be wired connections or wireless connections. The desired settings of the flow controllers C1,C2,C3,C4 are based on the measurement data that the flow control unit receives from the flow sensor 23 in the measurement line 21.

In a variant to the embodiment of FIG. 6, one or more flow sensors are arranged downstream of the flow controllers and upstream of the reactors. These flow sensors can provide feedback data with respect to the actual flow rate, which is fed back to the flow control unit 50. By means of this feed back data, the flow rate can be controlled more accurately.

Figure 7:
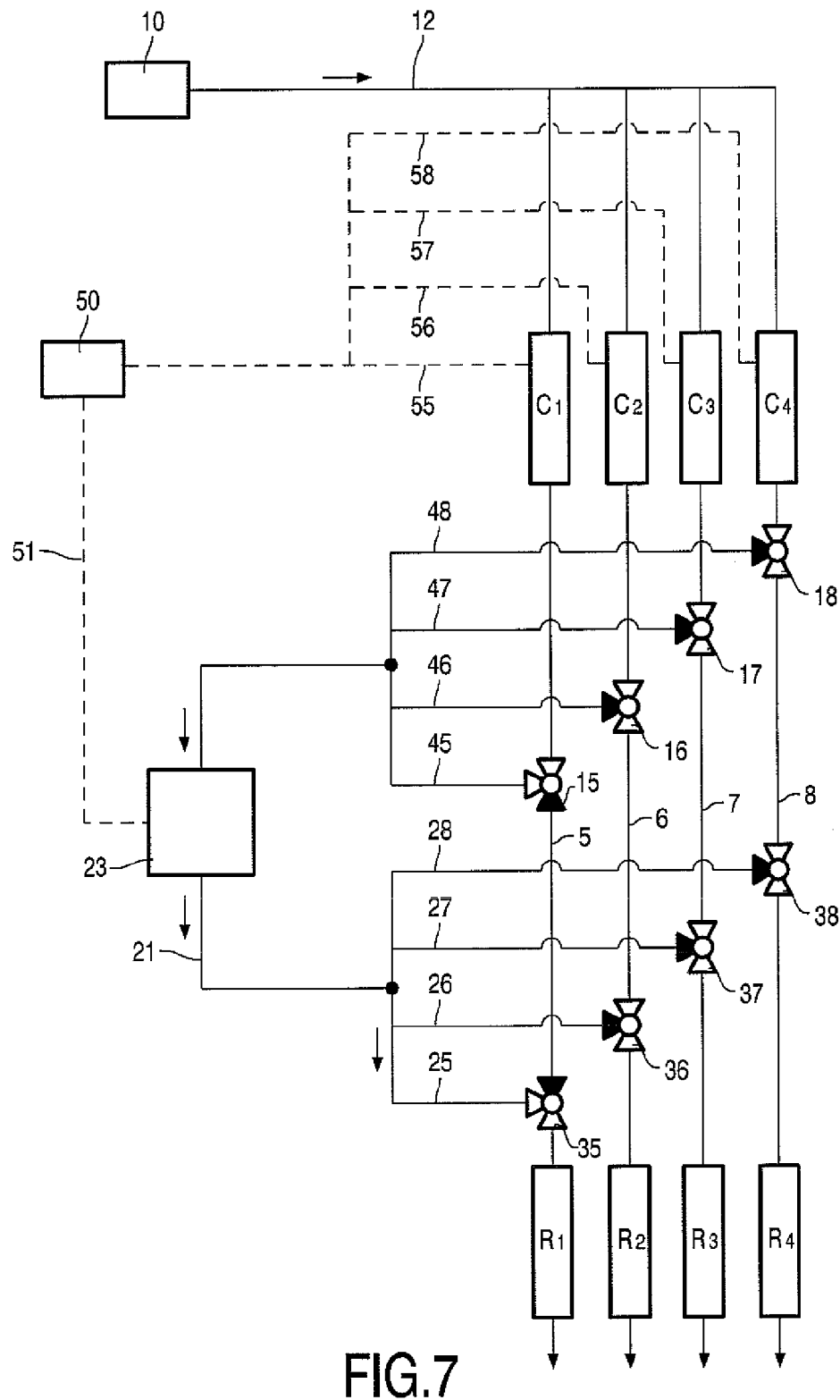

FIG. 7 shows a variant of the embodiment of FIG. 4. In this variant, the flow sensor 23 of the measurement line 21 is used in a control loop for controlling the flow rate of the reactor feed flows.

FIG. 7 shows the valve setting during the first step of the measurement cycle. The skilled person will understand that the control loop is not limited to this step of the measurement cycle.

Like in the embodiment of FIG. 6, in the embodiment of FIG. 7 each reactor feed line is provided with a flow controller C1,C2,C3,C4. These flow controllers are active flow controllers, so that their setting can be changed during the course of the experiments without having to interrupt the experiments. Although FIG. 7 shows that the flow controllers are arranged upstream of the inlets of the measurement line, they can also be arranged downstream of the outlets of the measurement line. It is also conceivable that they are arranged in the part of the reactor feed lines between the inlet and the outlet of the measurement line.

The embodiment of FIG. 7 further comprises a flow control unit 50. This flow control unit 50 receives flow measurement data form the flow sensor 23 through a data input connection 51. This data input connection 51 can be a wire, but it can also be a wireless connection.

The flow control unit 50 controls the settings of the flow controllers C1,C2,C3,C4 through control connections 55,56, 57,58. These control connected can be wired connections or wireless connections. The desired settings of the flow controllers C1,C2,C3,C4 are based on the measurement data that the flow control unit receives from the flow sensor 23 in the measurement line 21.

In embodiments of the system and method according to the invention in which a control loop is present that uses measurement data of the flow sensor 23 in the measurement line 21, such as in the ones shown in FIG. 6 and FIG. 7, it is possible that the flow control unit compares the measurement data for the different flows. In such a case, the settings of the flow controllers in the reactor feed lines can be adjusted such that the desired ratio of the flow rates of the reactor feed flows is obtained.

Figure 8:
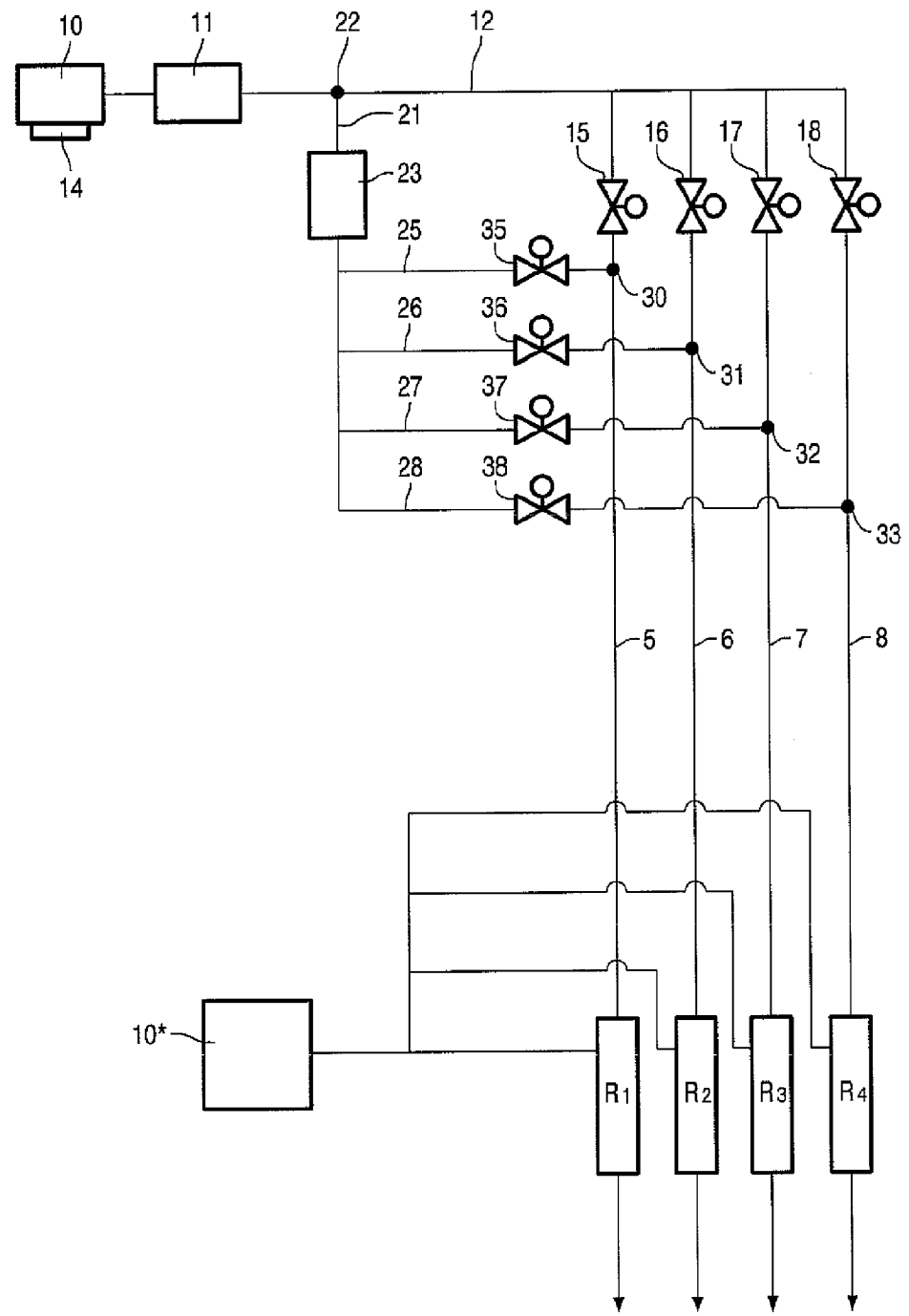

FIG. 8 shows a further variant of the embodiment of FIG. 2.

In this embodiment, a second flow sensor 11 is arranged in the common feed line 12, upstream of the inlet 22 of the measurement line 21. The second flow sensor 23 measures the flow rate of the combined feed flow. The combined feed flow has a larger flow rate than the reactor feed flows. As a consequence, the combined feed flow can be measured easier and more accurate than the reactor feed flows. Just a single flow sensor is necessary to measure the combined feed flow, which keeps the costs at bay, or allows to invest in a more expensive, higher quality flow sensor.

It is possible to use the measurement data from the second flow sensor 11 in addition to the measurement data from the first flow sensor 23. For example, the first flow sensor 23 (the one in the measurement line 21) can be used only to determine the ratio of the flow rates of the reactor feed flows, while the absolute value of the flow rates of the reactor feed flows is calculated on the basis of this ratio and the measured flow rate of the combined feed flow. For example, if with the first sensor 23 it is determined that the ratio of the flow rates of the first to the fourth reactor feed flow is 1:2:1:1, and the combined flow rate is measured to be 50 ml/minute, then it can be concluded that the flow rate in the first, third and fourth reactor feed line is 10 ml/minute, while the flow rate in the second reaction feed line is 20 ml/minute.

An advantage of using the second flow sensor in addition to the first flow sensor is that the second flow sensor can be a more regular flow sensor than the first flow sensor, as the measuring range of the second flow sensor can be one that is more commonly used in the industry. Furthermore, being able to measure low flow rates usually involves a compromise in the design of the flow sensor, e.g. making it less robust, less reliable, less stable or less accurate. The second flow sensor generally will not have such a design compromise.

The set up with the second flow sensor makes it possible to obtain an accurate, reliable measurement of the flow rates of the reactor feed flows, as the measurement does not solely rely on the flow sensor that has to be capable of measuring small flows. An accurate measurement of the flow rate of the combined feed flow can be obtained by the second flow sensor, while the first flow sensor is solely used to determine the ratio between the flow rates of the reactor feed flows.

It will be clear that the second flow sensor 11 can also be applied in the other embodiments of the system and method according to the invention.

In the embodiment of FIG. 8, a mass gauge 14 has been provided that measures the mass of fluid source 10. The mass gauge 14 can be a simple balance or load cell on which the fluid source 10 rests. By monitoring the decrease of the mass of the fluid source over time during the experiments, it can be calculated what the mass flow rate is of the combined feed flow. The mass gauge can be used instead of the second flow sensor in the common feed line 12, or in addition to it. It will be clear to the skilled person that when the mass gauge 14 is used instead of the second flow sensor 11, the same advantages can be obtained as when using the second flow sensor 11.

In the variant of FIG. 8, a further fluid source 10* is provided. This further fluid source 10* provides a second reaction fluid to the reactors R1,R2,R3,R4. This further reaction fluid can be gas, a liquid or a combination of a gas and a liquid.

It will be clear that the further fluid source 10* can also be applied in the other embodiments of the system and method according to the invention. It will also be clear that in any embodiment either the second flow sensor 11 or the further fluid source 10* can be present.

Figure 9:
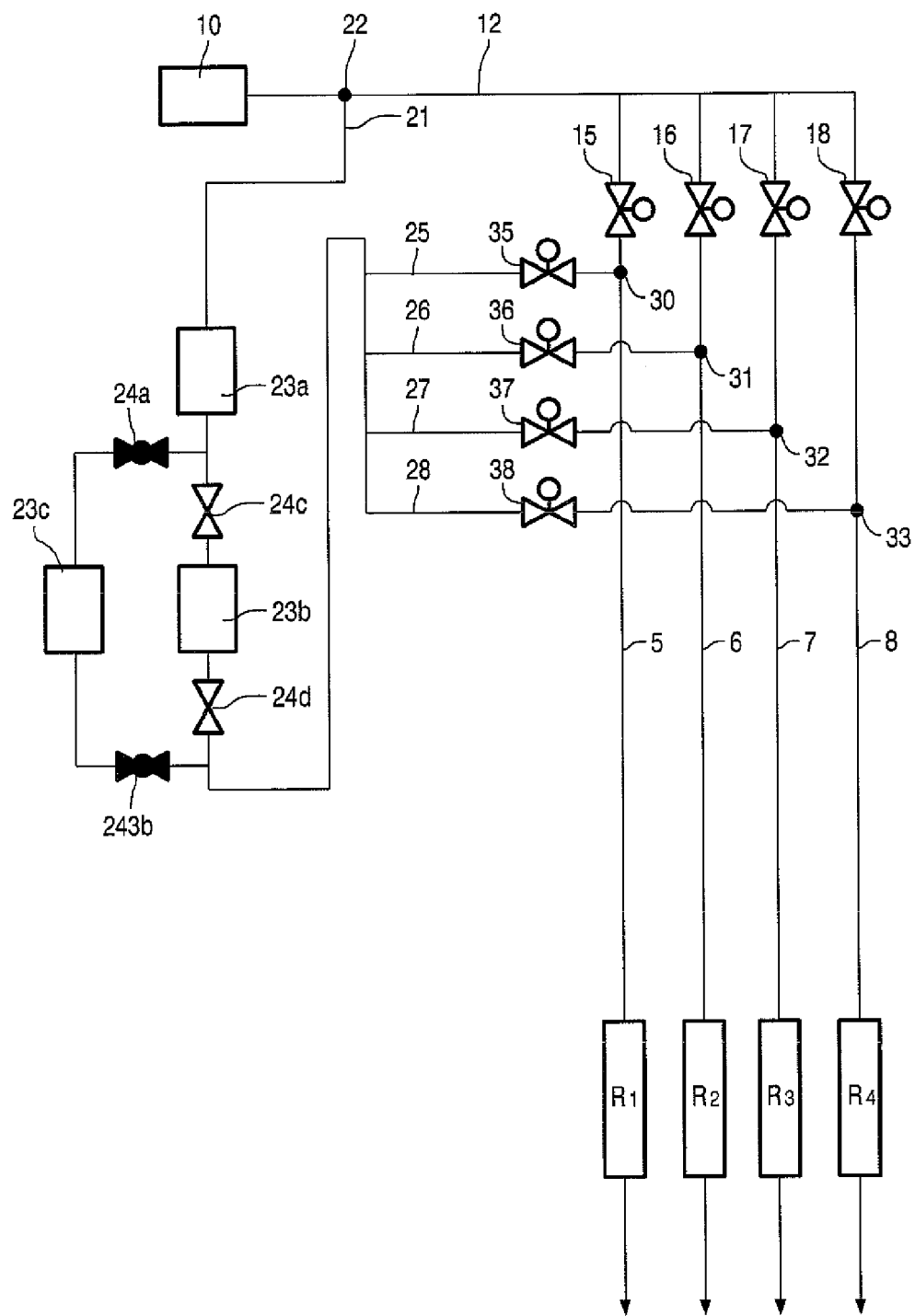

FIG. 9 shows a further variant of the embodiment of FIG. 2.

In this embodiment, a plurality of flow sensors 23a,23b, 23c is present in the measurement line 21.

Flow sensors 23a and 23b are arranged in series. Flow sensor 23a has a first measurement range, while flow sensor 23b has a second measurement range, which is different from the first measurement range of flow sensor 23a. This way, flow rates can be measured over an increased range.

Flow sensors 23b and 23c are arranged in parallel. Valves 24a,24b,24c,24d are provided in order to direct the fluid flow through either flow sensor 23b or through flow sensor 23c. In this example, the flow sensors 23b and 23c are the same or at least similar. If in the situation depicted in FIG. 9 flow sensor 23b fails during an experiment, valves 24a and 24b can be opened and valves 24c and 24d closed, such that the fluid flows through sensor 23c. This way the experiment and the measurements do not have to be interrupted due to the failure of the flow sensor 23b. Flow sensor 23b can even be replaced without having to interrupt the experiment of the measurements.

It will be clear that more flow sensors can be arranged in parallel and/or in series or that just flow sensors in series or just flow sensors in parallel can be used. It will also be clear that a measurement line having a plurality of flow sensors can be applied in any of the embodiments of the system and method according to the invention.

Figure 10:
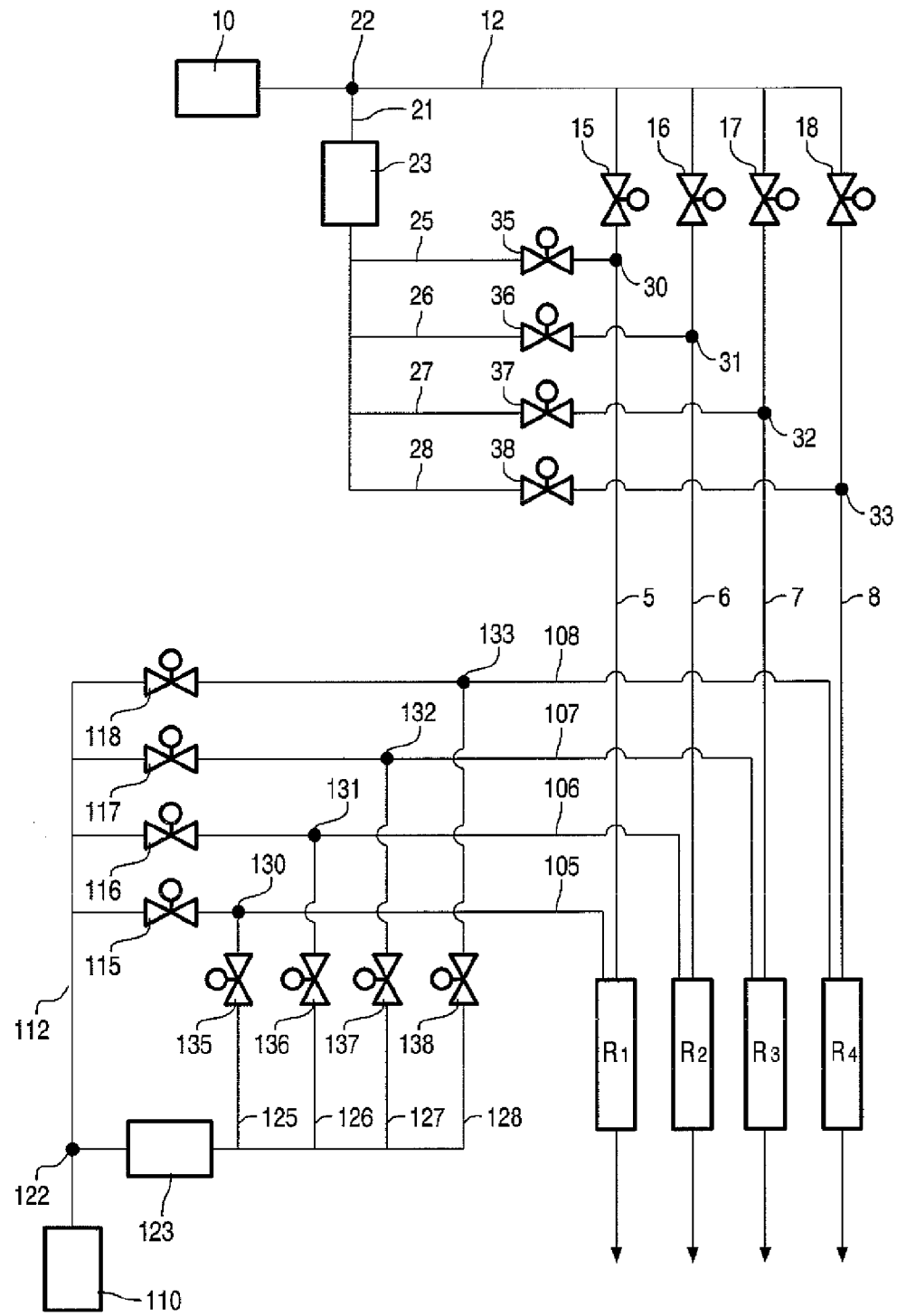

FIG. 10 shows a variant of FIG. 2 in which an additional fluid source 110 is provided. The additional fluid source 110 is connected to the reactors R1,R2,R3,R4 via an additional common feed line 112 and additional reactor feed lines 105, 106,107,108. In the additional reactor feed lines, valves 115, 116,117,118 are present.

The embodiment of FIG. 10 also comprises an additional measurement line 121 and an additional flow sensor 123. The additional measurement line has a single inlet 122, and branches 125,126,127,128, valves 135,136,137,138 and outlets 130,131,132,133. Outlet 130 is connected to additional reactor feed line 105, outlet 131 is connected to additional reactor feed line 106, outlet 132 is connected to additional reactor feed line 107 and outlet 133 is connected to additional reactor feed line 108.

The subsystem of the additional fluid source, additional common feed line, additional reactor feed lines, additional measurement line, additional flow sensor and the associated valves makes it possible to supply a second fluid to the reactors. It also allows to measure the flow rate of the reactor feed flows of this second fluid in a way that is in accordance with the invention.

The subsystem of FIG. 10 can also be used in combination with the other embodiments of the invention.

In addition or as an alternative of the subsystem as shown in FIG. 10, it is also possible to devise a subsystem for the addition of a second fluid on the basis of the embodiment of FIG. 4.

Figure 11:
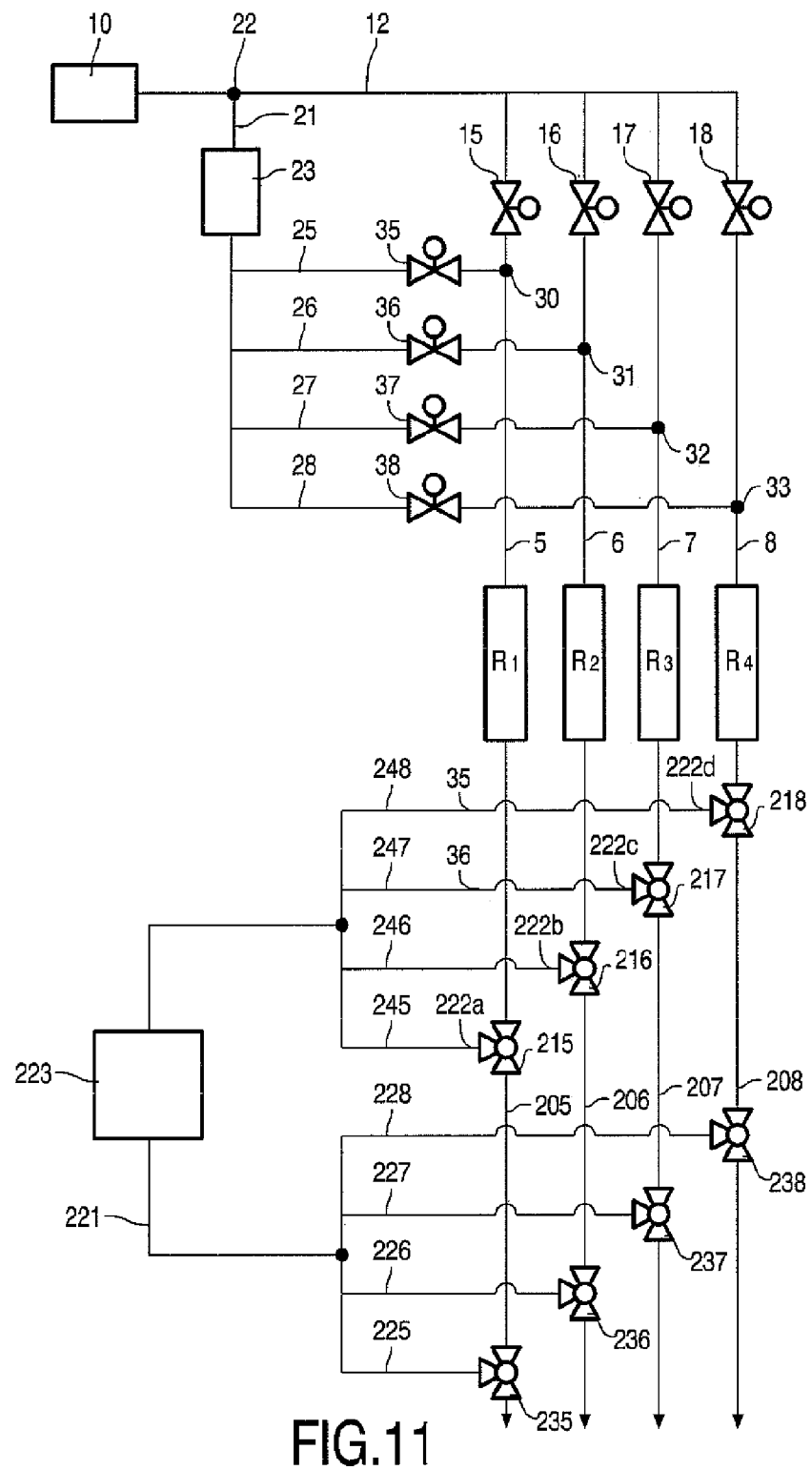
FIG. 11: a further embodiment in the invention.

FIG. 11 shows an embodiment in which a measurement line 223 in accordance with the invention is used to measure the flow rate of the effluent streams leaving the reactors R1,R2,R3,R4.

In this embodiment, each reactor R1,R2,R3,R4 has been provided with an effluent conduit 205,206,207,208. The effluent conduit takes the effluent that leaves a reactor e.g. to an analyser, or to a sample collection receptacle (for later off line analysis), or to a selection valve which directs the reactor effluent either to an analyser or to waste.

In the embodiment, an effluent measurement line 221 has been provided. In the effluent measurement line 221, an effluent flow sensor 223 has been arranged.

Valves 215,216,217,218 are arranged at the inlets 222a, 222b,222c,222d of the inlet branches 245,246,247,248 of the effluent measurement line 221. Valves 235,236,237,238 are arranged at the outlets of the outlet branches 225,226,227,228 of the effluent measurement line 221.

When measuring of the flow rates of the effluent streams is desired, the valves are set such that one effluent stream is redirected such that it bypasses part of the effluent conduit and through the effluent measurement line 221. After some time, the valve settings are changed such that an other effluent stream is directed through the effluent measurement line 221, and the previously redirected flow flows through the entire effluent conduit again. In a measurement cycle, the flow rates of all effluent streams is measured once.

The effluent measurement line 221 is used in basically the same way as the measurement line 21 upstream of the reactors as is described in relation to the FIGS. 4 and 5.

Measuring the effluent flow rate as shown in FIG. 10 can take place regardless of which configuration is used upstream of the reactors for the supply of the reactor feed.

Figure 12:
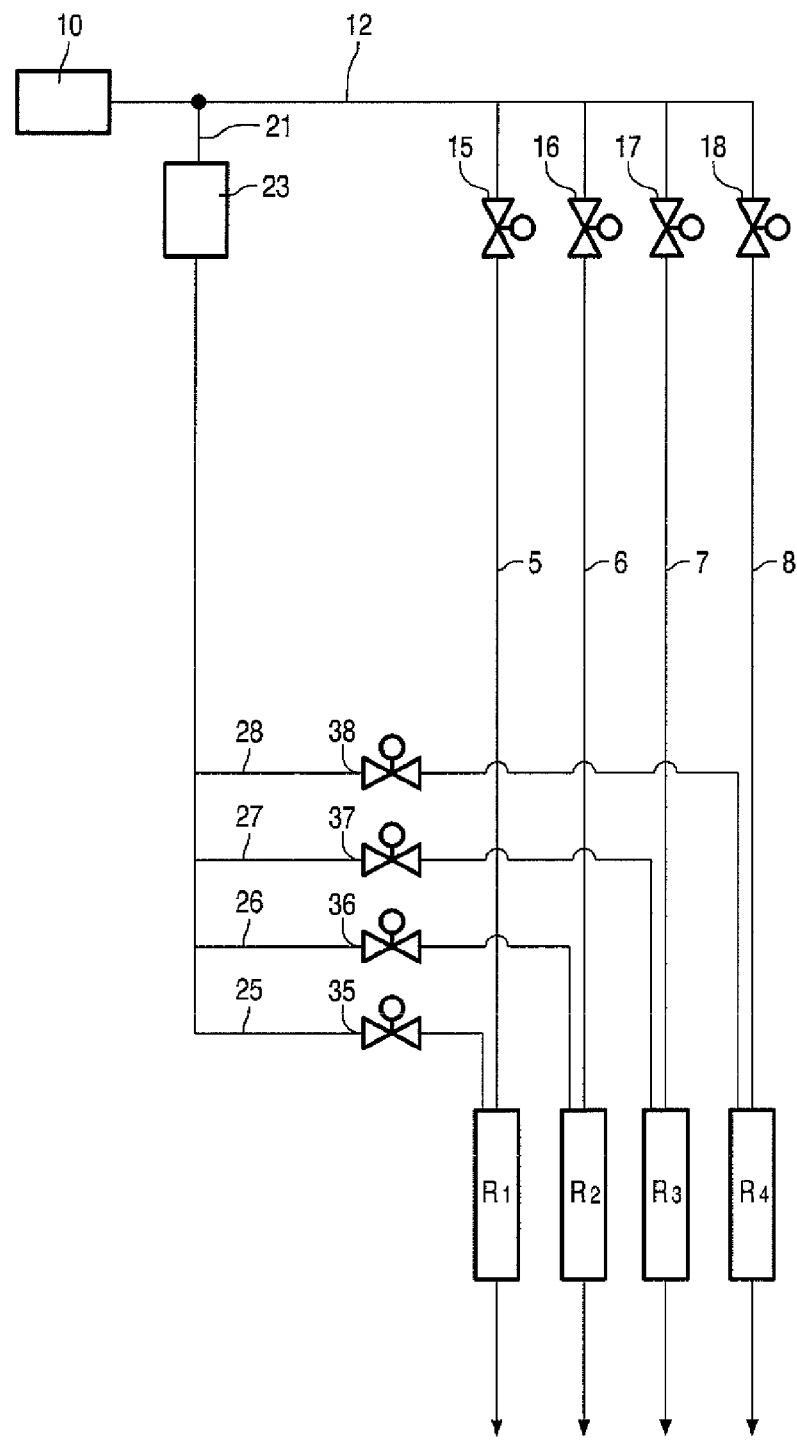
FIG. 12: a further embodiment in the invention.

FIG. 12 shows a configuration in which the outlets of the measurement line 21 are not connected to the reactor feed lines, but directly to the reactors R1,R2,R3,R4. FIG. 12 is based on the embodiment of FIG. 2, but also in the other embodiments of the invention, the outlets of the measurement line can be connected directly to the reactors.

The invention claimed is:

1. A system for measuring flow rates of fluid flows to parallel reactors,
which system comprises:
a plurality of reactors, each of the reactors having a reactor inlet,
a common feed line,
the common feed line having a common feed line inlet for receiving a fluid from a fluid source and at least one common feed line outlet, the received fluid forming a combined feed flow,
the common feed line being adapted to transport said combined feed flow from the common feed line inlet to the common feed line outlet of outlets,
a plurality of reactor feed lines for receiving a reactor fluid flow, which reactor fluid flow is a part of the combined feed flow from the common feed line, and for transporting said reactor fluid flow to at least one of the plurality of reactors, each reactor feed line extending between a common feed line outlet and the reactor inlet of said reactor, a measurement line, which measurement line has a plurality of measurement line outlets, each of the measurement line outlets connected to one of the reactor feed lines or to one of the reactors, and which measurement line has either one measurement line inlet that is connected to the common feed line or a plurality of measurement line inlets, each of those measurement line inlets being connected to one of the reactor feed lines, in the measurement line, a first flow sensor for measuring the flow rate of the fluid flow through the measurement line, and a valve system, comprising one or more valves and a valve control unit for controlling the one or more valves, the valve system being arranged and/or adapted such that it can assume a measurement setting in which the valves redirect one of the reactor feed flows such that it flows through the measurement line.

2. The system according to claim 1,
wherein the system further comprises:
in each reactor feed line, a flow controller, and
a flow control unit, which is adapted to control the flow rates of the reaction fluid flows through the flow controllers in the reactor feed lines, said control being based on the measurements of the first flow sensor.

3. The system according to claim 2,
wherein at least one flow controller comprises a temperature controlled capillary, a mass flow controller or a coriolis flow controller.

4. The system according to claim 1,
wherein the valve system is adapted to sequentially redirect all reactor feed flows through the measurement line.

5. The system according to claim 1,
wherein the system further comprises a second flow sensor for measuring the flow rate of the combined feed flow, which second flow sensor is arranged in the common feed line.

6. The system according to claim 5,
wherein the first flow sensor and/or the second flow sensor are based on the time-of-flight principle.

7. The system according to claim 1,
wherein the system further comprises a mass gauge, which mass gauge is arranged such that it measures the mass of the fluid source and/or any changes in the mass of the fluid source.

8. The system according to claim 1,
wherein the reactor feed lines are each provided with a flow controller, and wherein the measurement line has a single measurement line inlet, and wherein the measurement line outlets are connected to the reactor feed lines upstream of the flow controllers, and the measurement line inlet is connected to the common feed line.

9. The system according to claim 1,
wherein the reactor feed lines are each provided with a flow controller, and wherein the measurement line has a plurality of measurement line inlets, and wherein both the measurement inlets and the measurement line outlets are connected to the reactor feed lines downstream of the flow controllers.

10. The system according to claim 1,
wherein at least one outlet of the measurement line is connected to a reactor.

11. The system according to claim 1,
wherein the system further comprises:
a plurality of effluent conduits, each effluent conduit being connected to a reactor for receiving the effluent from said reactor and for transporting said effluent away from said reactor, an effluent measurement line, which effluent measurement line has a plurality of effluent measurement line inlets, each of the effluent measurement line inlets being connected to one of effluent conduits, and which effluent measurement line has a plurality of effluent measurement line outlets, each of those effluent measurement line outlets being connected to one of the effluent conduits, in the effluent measurement line, an effluent flow sensor for measuring the flow rate of the fluid flow through the effluent measurement line, and an effluent valve system, comprising one or more valves and a valve control unit for controlling the one or more valves, the effluent valve system being arranged and/or adapted such that it can assume a measurement setting in which the valves redirect one of the effluent flows such that it flows through the effluent measurement line.

12. A method for measuring flow rates of fluid flows to parallel reactors,
which method comprises the following steps:
providing a system according to claim 1,
supplying a combined feed flow to the inlet of the common feed line,
distributing the combined feed flow over the reactor feed lines, therewith splitting the combined feed flow into a plurality of reactor fluid flows,
transporting each reactor fluid flow to a reactor,
carrying out a flow rate measurement, which flow rate measurement comprises the following steps:
controlling the setting of the valve or valves such that a reactor fluid flow is diverted such that it flows through the measurement line,
measuring the flow rate of this diverted reactor fluid flow, and
supplying the diverted reactor fluid flow to a reactor.

13. The method according to claim 12,
wherein the method further comprises the flowing steps:
changing the setting of the valve or valves such that diverted reactor fluid flow is not diverted through the measurement line any more,
changing the setting of the valve or valves such that an other reactor fluid flow is diverted such that it flows through the measurement line,
measuring the flow rate of this diverted reactor fluid flow,
supplying the diverted reactor fluid flow to a reactor, and
repeating the above steps of the measurement cycle for all reactor fluid flows.

14. The method according to claim 13,
wherein the method further comprises the following steps:
determining the differences between the flow rates of the different reactor fluid flows, and
using a flow control unit for controlling the flow rates of the reactor fluid flows through the reactor feed lines, the controlling being based on the determined differences in flow rates of the reactor fluid flows.

* * * * *